(12) United States Patent
Hu et al.

(10) Patent No.: US 8,897,448 B2
(45) Date of Patent: Nov. 25, 2014

(54) CONTROLLING SESSION KEYS THROUGH IN-BAND SIGNALING

(75) Inventors: Xiaoqing Hu, Kanata (CA); Frederic F. Simard, Nepean (CA)

(73) Assignee: Ciena Corporation, Hanover, MD (US)

( * ) Notice: Subject to any disclaimer, the term of this patent is extended or adjusted under 35 U.S.C. 154(b) by 684 days.

(21) Appl. No.: 12/262,945

(22) Filed: Oct. 31, 2008

(65) Prior Publication Data

US 2010/0111307 A1 May 6, 2010

(51) Int. Cl.
*G06F 21/00* (2013.01)
*H04L 9/32* (2006.01)
*H04L 29/06* (2006.01)
*H04L 9/08* (2006.01)

(52) U.S. Cl.
CPC ............ *H04L 9/0841* (2013.01); *H04L 9/3271* (2013.01); *H04L 63/0823* (2013.01); *H04L 63/061* (2013.01); *Y02B 60/44* (2013.01)
USPC .......................................... 380/277; 713/151

(58) Field of Classification Search
USPC ............................ 380/277; 713/151; 370/522
See application file for complete search history.

(56) References Cited

U.S. PATENT DOCUMENTS

| | | | | |
|---|---|---|---|---|
| 5,706,347 | A * | 1/1998 | Burke et al. ................... | 713/153 |
| 5,706,348 | A | 1/1998 | Gray et al. | |
| 5,825,890 | A * | 10/1998 | Elgamal et al. ............... | 713/151 |
| 5,905,733 | A * | 5/1999 | Solve et al. .................... | 370/522 |
| 6,101,255 | A | 8/2000 | Harrison et al. | |
| 6,985,953 | B1 * | 1/2006 | Sandhu et al. ................ | 709/229 |
| 2002/0042875 | A1 | 4/2002 | Shukla | |
| 2002/0066013 | A1 | 5/2002 | Relander et al. | |
| 2002/0133701 | A1 * | 9/2002 | Lotspiech et al. ............ | 713/163 |
| 2004/0146015 | A1 * | 7/2004 | Cross et al. .................... | 370/328 |
| 2004/0181811 | A1 * | 9/2004 | Rakib ............................ | 725/122 |
| 2004/0196978 | A1 * | 10/2004 | Godfrey et al. ............... | 380/270 |
| 2005/0094640 | A1 | 5/2005 | Howe | |
| 2005/0177749 | A1 | 8/2005 | Ovadia | |
| 2006/0045273 | A1 * | 3/2006 | Mayer .......................... | 380/277 |
| 2008/0144502 | A1 * | 6/2008 | Jackowski et al. ............ | 370/235 |
| 2008/0270785 | A1 * | 10/2008 | Loprieno et al. .............. | 713/150 |

FOREIGN PATENT DOCUMENTS

EP          1119132 A2 *  7/2001

OTHER PUBLICATIONS

International Search Report and Written Opinion dated Mar. 26, 2010 for International Application No. PCT/IB2009/007213, International Filing Date Oct. 23, 2009 consisting of 4 pages.

* cited by examiner

*Primary Examiner* — Kambiz Zand
*Assistant Examiner* — Ali Shayanfar
(74) *Attorney, Agent, or Firm* — Muncy, Geissler, Olds & Lowe, P.C.

(57) ABSTRACT

The present invention employs in-band signaling between PTEs to provision and control session keys, which are used by the PTEs for encrypting and decrypting traffic that is carried from one PTE to another over a transport network. In operation, a first PTE will receive incoming traffic from a first edge network, map the traffic to frames, encrypt the traffic with a session key, and send the frames with the encrypted traffic over the transport network to a second PTE. The second PTE will extract the encrypted traffic from the frames, decrypt the encrypted traffic with a session key, and send the recovered traffic over a second edge network toward an intended destination. If symmetric encryption is employed, the session key used by the first PTE to encrypt the traffic will be identical to the session key used by the second PTE to decrypt the traffic.

22 Claims, 16 Drawing Sheets

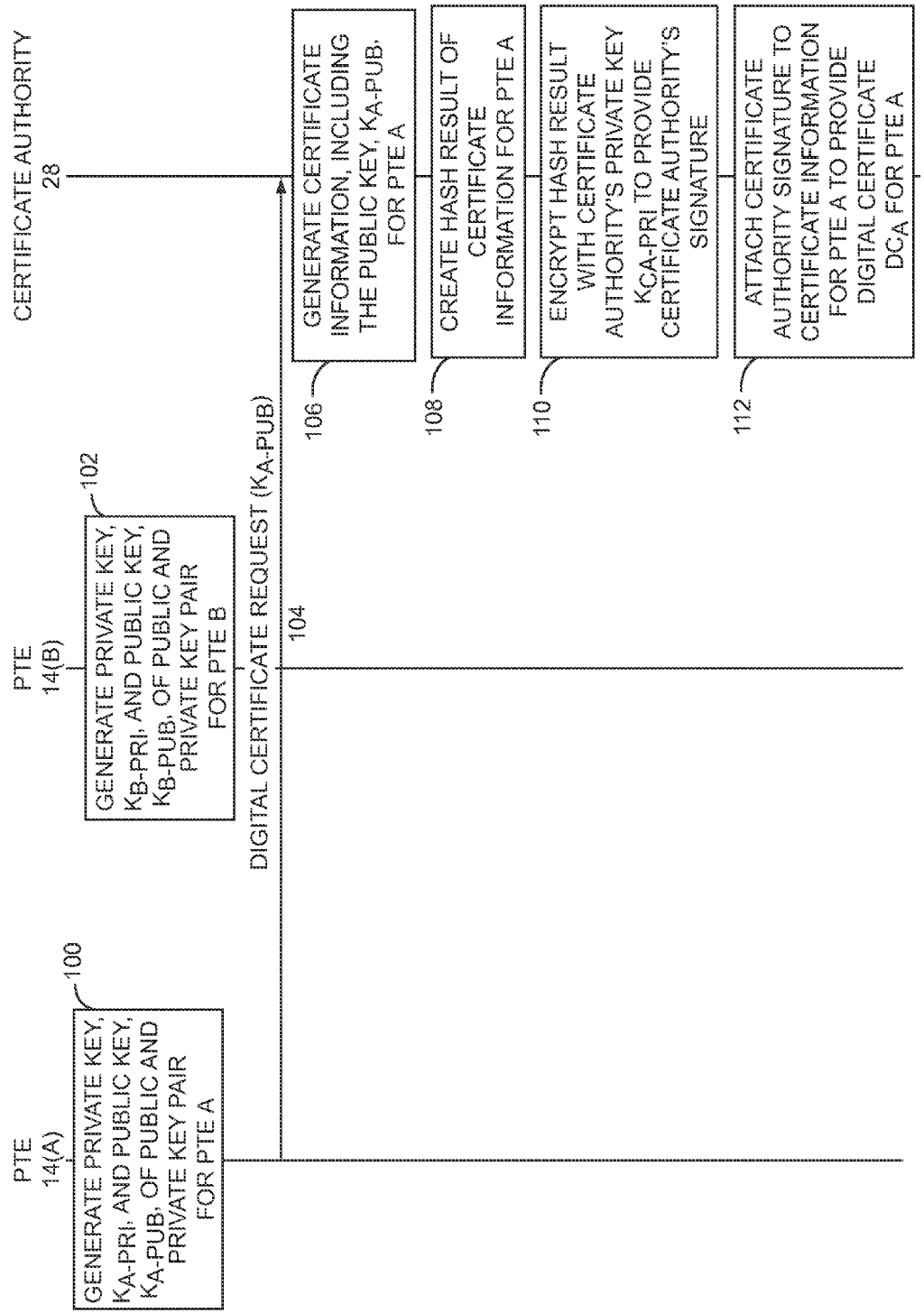

CONTROLLING SESSION KEYS THROUGH IN-BAND SIGNALING

FIELD OF THE INVENTION

The present invention relates to communications, and in particular to controlling session keys through in-band signaling.

BACKGROUND OF THE INVENTION

Transport networks are under continual demand to carry more information at higher speeds and lower costs, and optical networks are playing a critical role in addressing this demand. Optical transport networks provide an optical-based physical layer for transmitting information across the network. One of the main characteristics of optical transport networks is the use of frame structured digital bit streams to transport data across the network. The frames typically have a payload area and an overhead area, which contains control information. The frame overhead is analogous to the header of an Internet Protocol packet. The path through an optical transport network generally extends between two edge devices, which are generally referred to as path termination equipment (PTE). Along the path through the optical transport network reside any number of switches, regenerators, multiplexers, and the like. Frames traveling along the path from one PTE to another will pass through the intermediate devices.

There is a need to protect the confidentiality of the data carried by the frames as the frames travel through the optical network. In many instances, incoming data to be carried by the frames over the path is encrypted at an origination PTE before being transported over the path. The encrypted data is allocated to one or more frames and transported over the path. The intermediate nodes are not configured to decrypt or otherwise gain access to the encrypted data. Upon arriving at the termination PTE at the other end of the path, the encrypted data is extracted from the frames, decrypted, and converted to an appropriate format for further delivery.

Given the speed and complexity of optical transport networks, the use of symmetric encryption, where the same key is used for encryption and decryption, is preferred. With symmetric encryption, the same key must be provided to the encrypting and decrypting PTE. To ensure that the key used for encryption and decryption is not comprised, the key is periodically changed at the encrypting PTE and the decrypting PTE. Such changing requires the encrypting and decrypting PTEs to coordinate with one another to select a new key and determine when and how to change the key. The changing of the key poses logistical and operational issues, as special mechanisms must be provided to ensure that unauthorized entities do not gain access to the key. Such access could allow third parties to improperly retrieve and decrypt the data being carried over the optical transport network.

Existing techniques to provide and control the changing of keys being used at the PTEs have proven to be inefficient, complex, and costly. These techniques range from manually providing keys to the various PTEs to employing separate Operations, Administration and Maintenance (OAM) networks to provide keys to the PTEs and control the changing of keys at the PTEs. With manual provisioning, workers must physically travel to the PTEs to load keys and instructions for changing the keys. When a separate OAM network is used, the OAM network must be established and maintained apart from the optical transport network. Once the OAM network is provided, the PTEs may communicate with each other via the OAM network to share keys and control the changing of keys outside of the optical transport network. Alternatively, an OAM server that resides on the OAM network may be tasked with interacting with the PTEs to provide keys to the PTEs and control the changing of the keys.

In each of these manual or automated techniques, the keys are not shared or controlled within the confines of the optical transport network. Since key provision and control is provided outside of resources used by the optical transport network to transport data, these techniques are generally referred to as out-of-band techniques. Given the inefficiency, complexity, and cost associated with out-of-band techniques for key provisioning and control, there is a need for an alternative technique that overcomes the deficiencies of current out-of-band techniques for key provisioning and control.

SUMMARY OF THE INVENTION

The present invention employs in-band signaling between PTEs to provision and control session keys, which are used by the PTEs for encrypting and decrypting traffic that is carried from one PTE to another over a transport network. In operation, a first PTE will receive incoming traffic from a first edge network, map the traffic to frames, encrypt the traffic with a session key, and send the frames with the encrypted traffic over the transport network to a second PTE. The second PTE will extract the encrypted traffic from the frames, decrypt the encrypted traffic with a session key, and send the recovered traffic over a second edge network toward an intended destination. If symmetric encryption is employed, the session key used by the first PTE to encrypt the traffic will be identical to the session key used by the second PTE to decrypt the traffic.

The frames include a payload for carrying the encrypted traffic and associated overhead that is used to carry control information. The control information is used to assist in controlling the delivery and processing the traffic. The session keys used by the PTEs to encrypt and decrypt the traffic are provisioned and controlled through key messaging that is exchanged between the PTEs. The key messaging is exchanged between the PTEs in the overhead of the frames. As such, the key messaging may be provided in the overhead of the frames along with other control information. A single message may be broken into numerous message portions and transported from one PTE to another over numerous frames to reduce the impact of the key messaging on the available overhead. Exchanging key messaging between PTEs in the overhead of frames is referred to as in-band key messaging. Key messaging includes messaging provided between PTEs and related to generating, selecting, changing, or otherwise controlling the session keys that are used by the PTEs to encrypt and decrypt traffic.

As indicated, the session keys are used for encrypting and decrypting traffic carried in the frames, and key messages are used to control the session keys. To enhance security, the key messages may be encrypted using master keys, which may be symmetric or asymmetric keys and are preferably different from the session keys. As such, a first PTE may generate a key message, encrypt the key message or portions of the key message, and map the key message or portions thereof to the overhead of a frame or a series of frames for delivery to a second PTE. The second PTE will receive the frame or frames, extract the encrypted key message or portions thereof, and decrypt the key message or portions thereof. If the key message is sent in portions, the second PTE will assemble the portions of the key message. Once the key message is recovered, the second PTE will process the key message accordingly.

In one embodiment of the present invention, a Diffie-Hellman key exchange process is used to allow the first and second PTEs to each derive a secret key, without having to pass the secret key between the PTEs. The master key for encrypting session messages may be the secret key or be a function of the secret key. The PTEs may authenticate each other to prevent man-in-the middle attacks by unauthorized parties and then initiate session key messaging to allow the PTEs to generate, select, change, or otherwise control the session keys that are used by the PTEs to encrypt and decrypt the traffic carried in the frames. The session keys may be based on the secret key, master key, or a pre-provisioned value, as well as be generated in a random or pseudo fashion. For example, a symmetric session key may be or be derived from another secret key that is created from a second Diffie-Hellman process. Notably, the in-band messaging associated with controlling the session keys, and perhaps the messaging associated with authentication, is preferably encrypted and decrypted using the master key.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 5B:
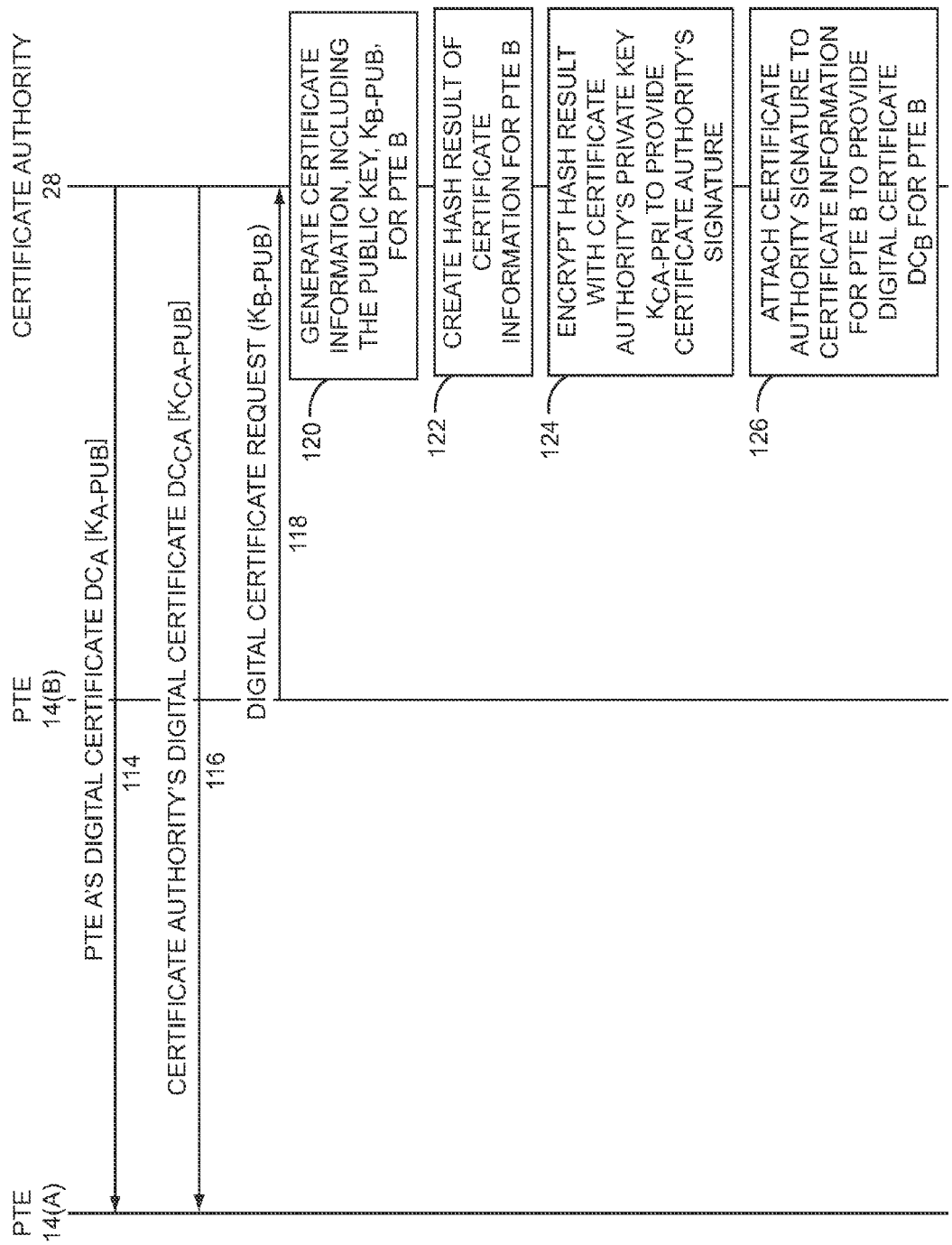
Figure 5C:
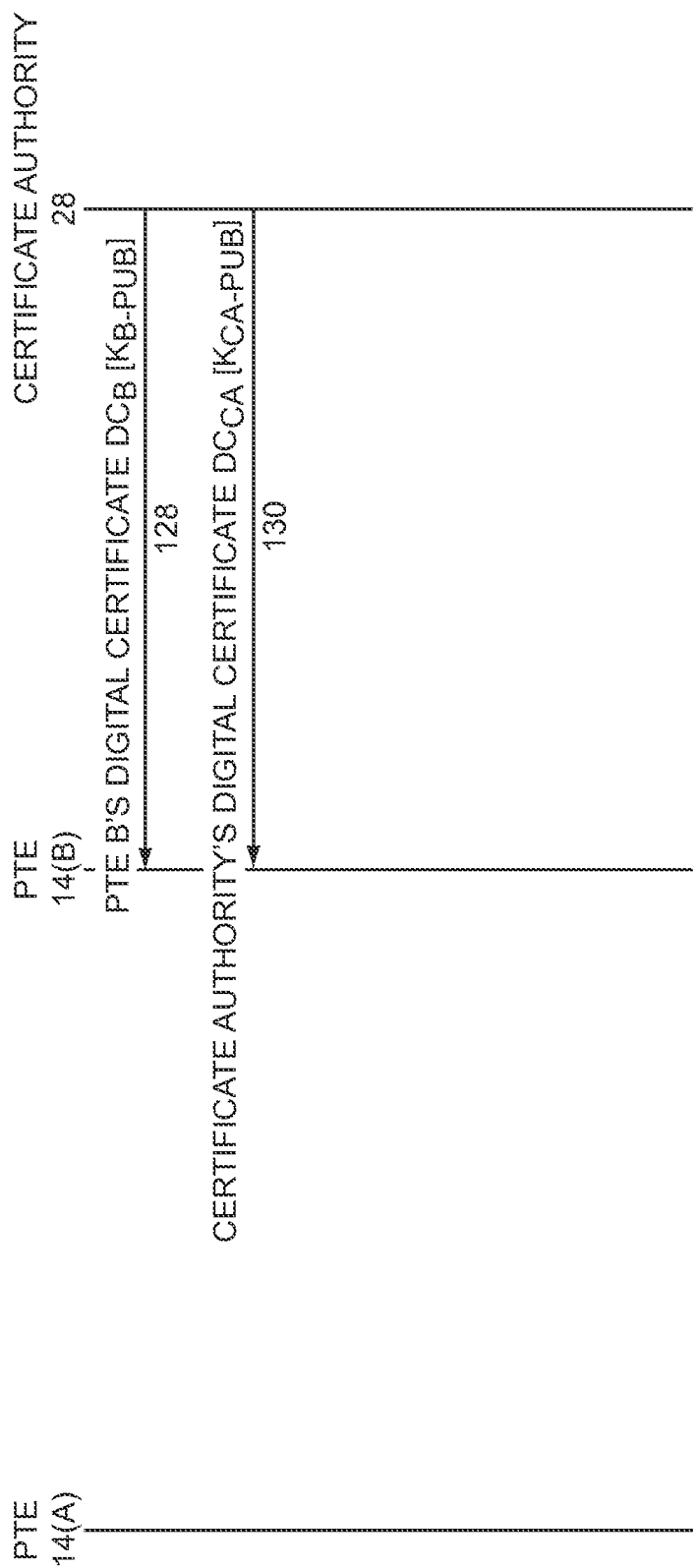

FIGS. 5A-5C provide a communication flow for generating public and private keys for a public and private key pair according to one embodiment of the present invention.

Figure 6:
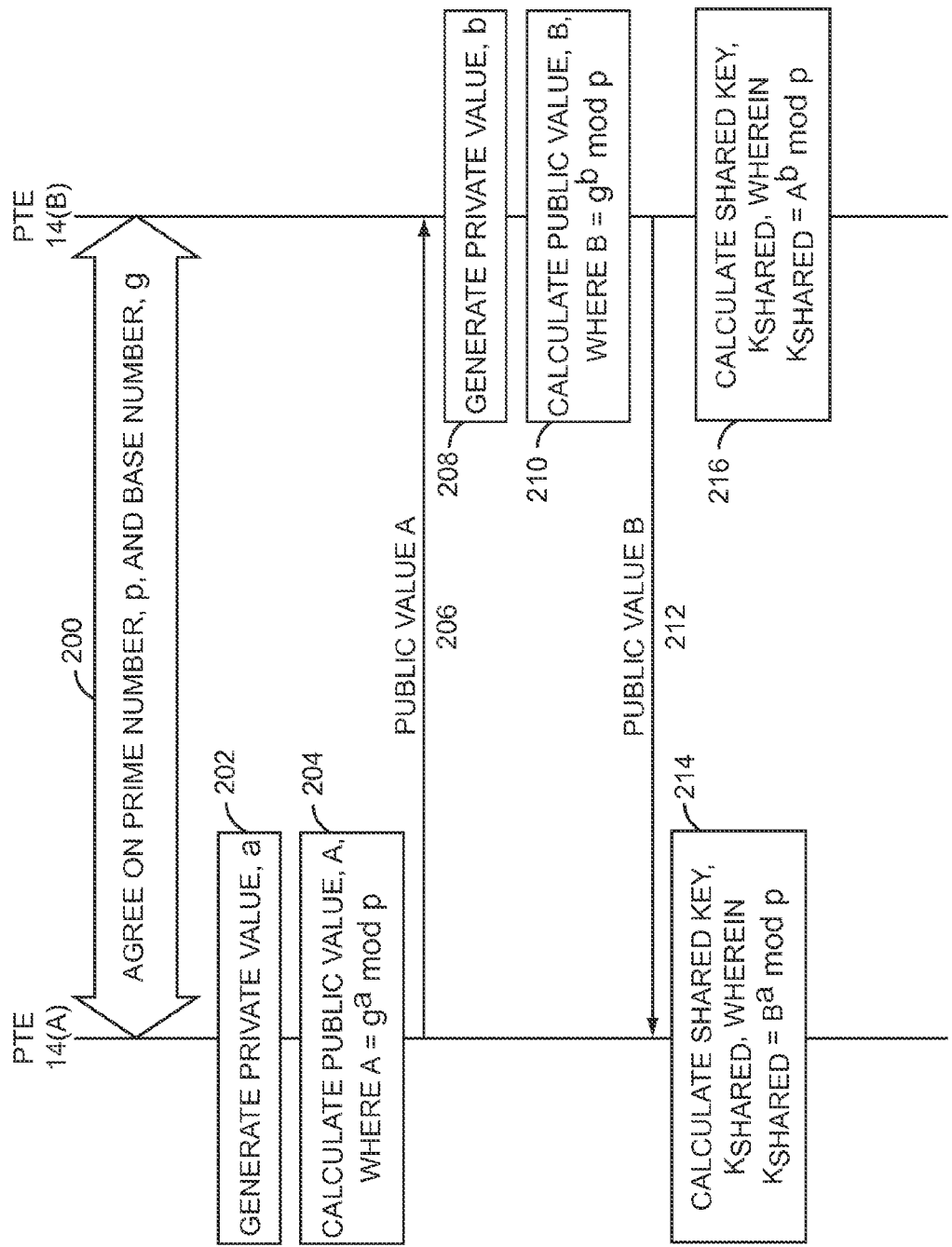
Figure 7A:
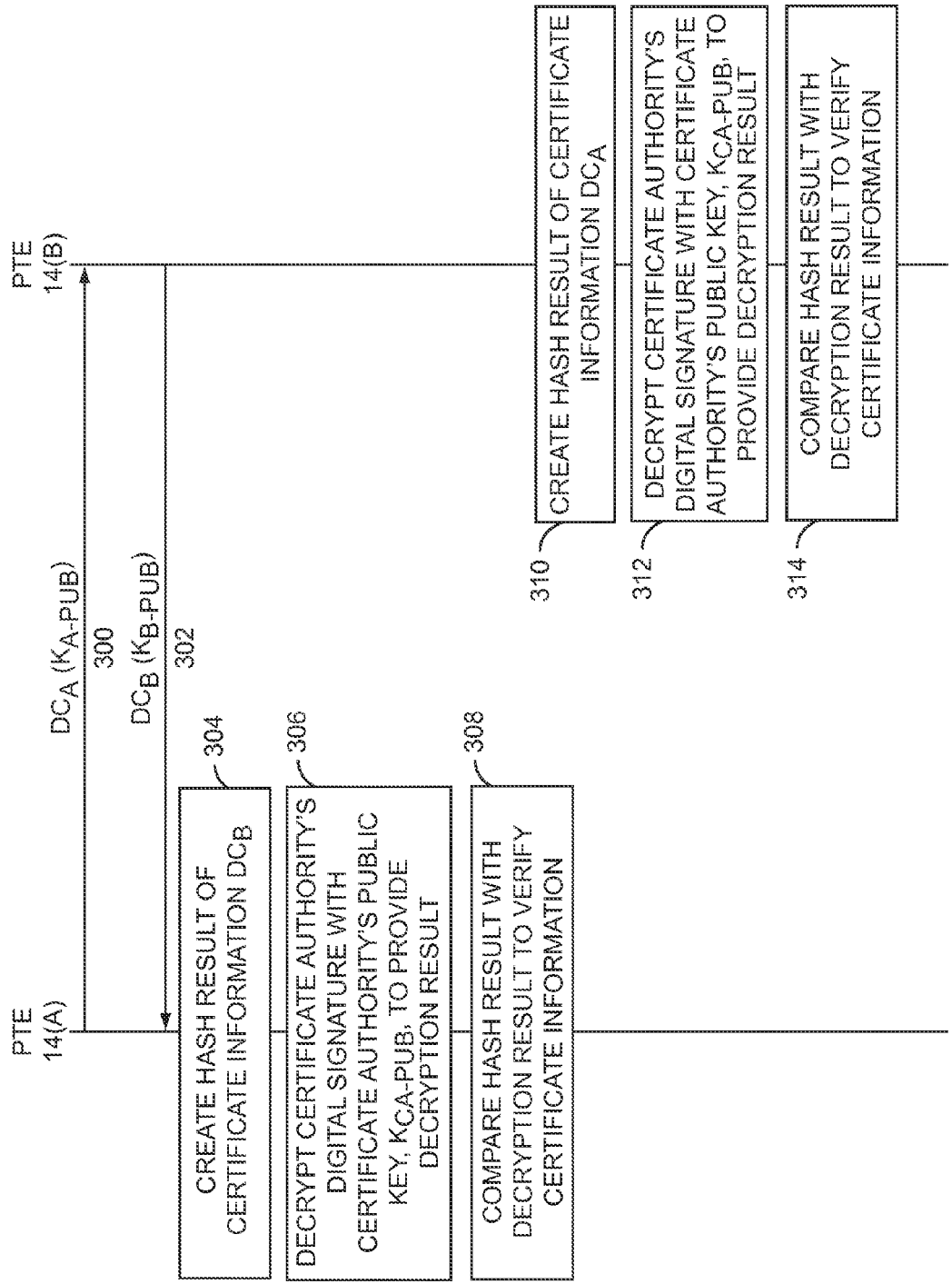
Figure 7B:
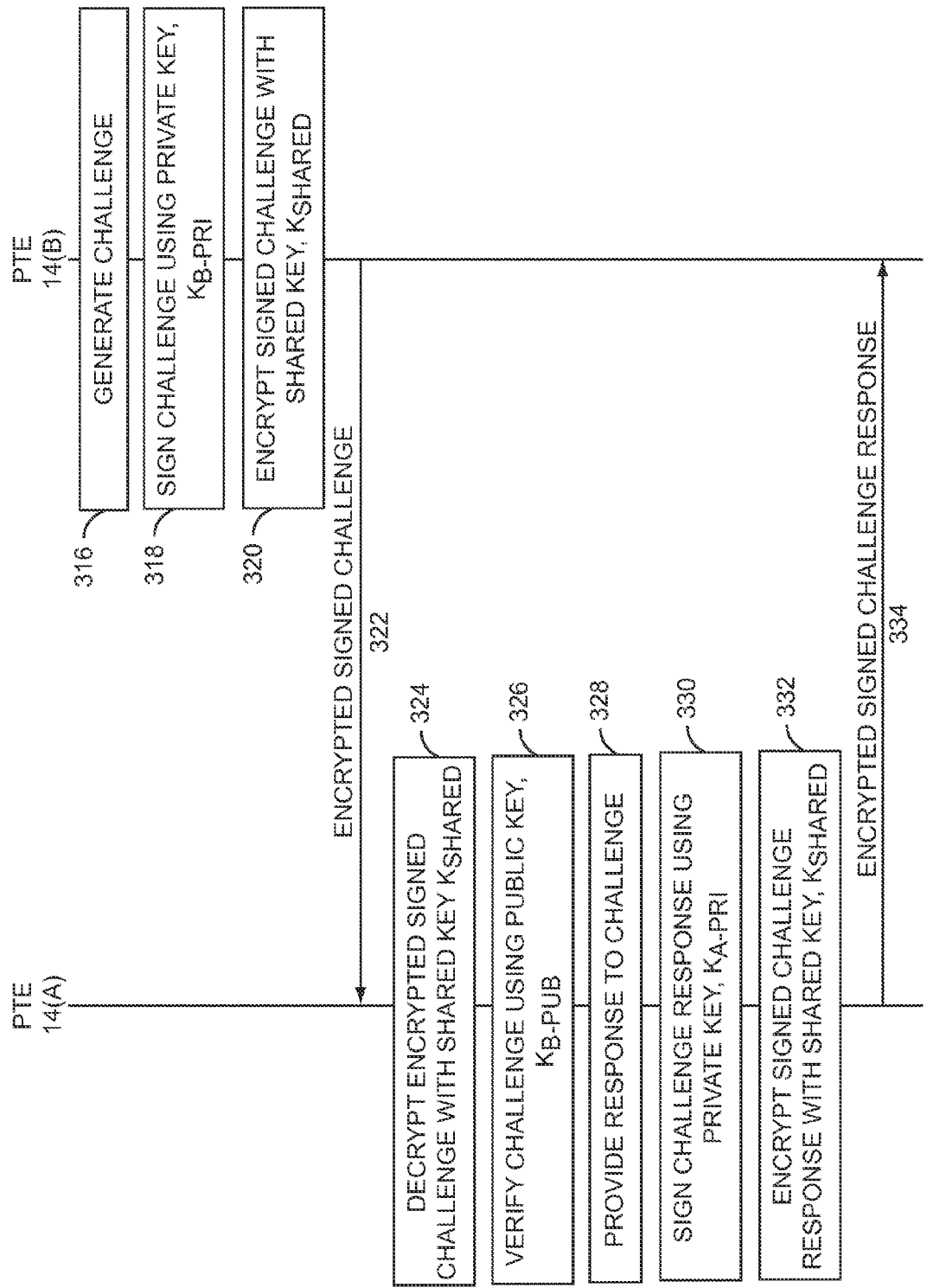
Figure 7C:
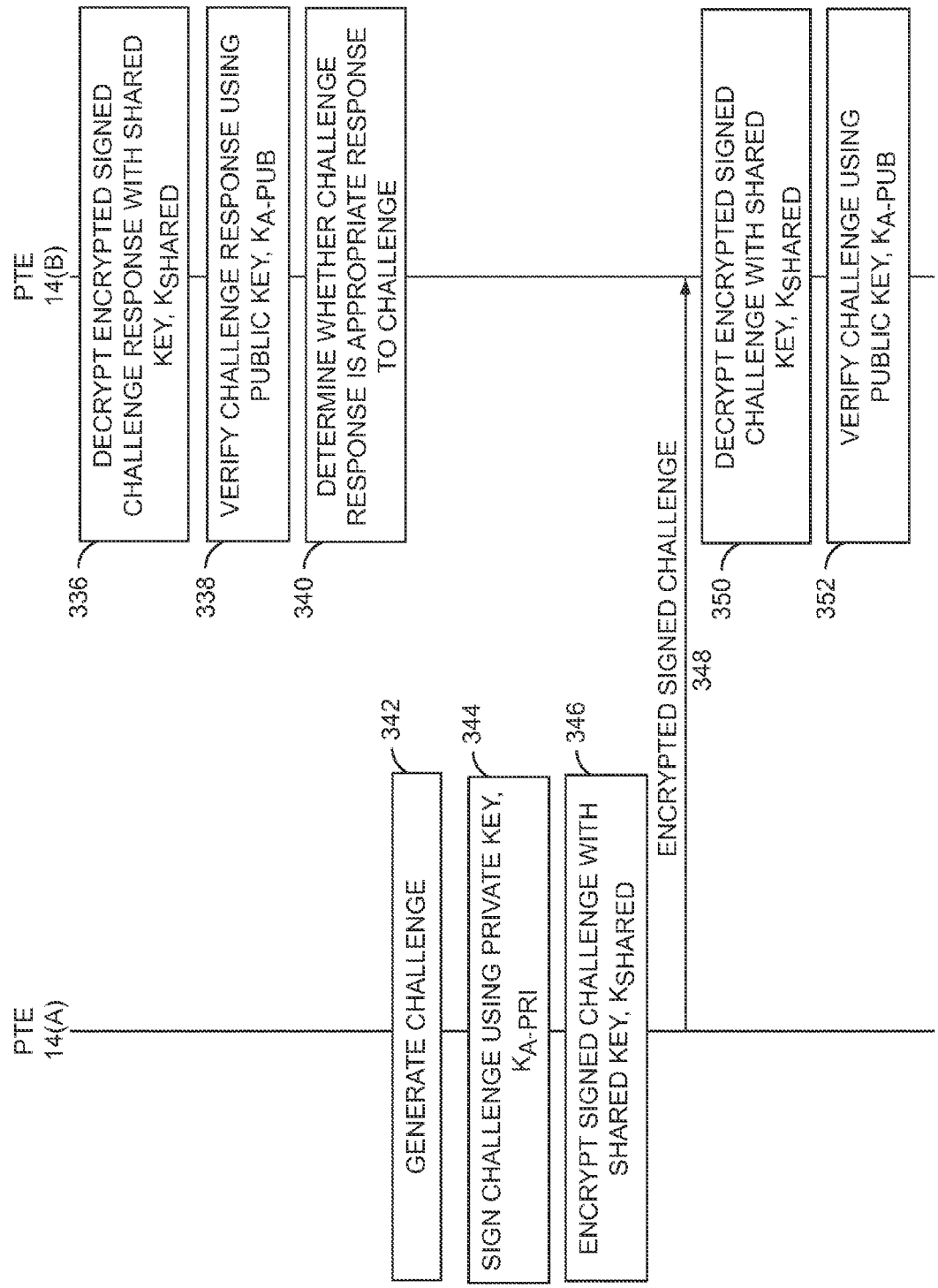
Figure 7D:
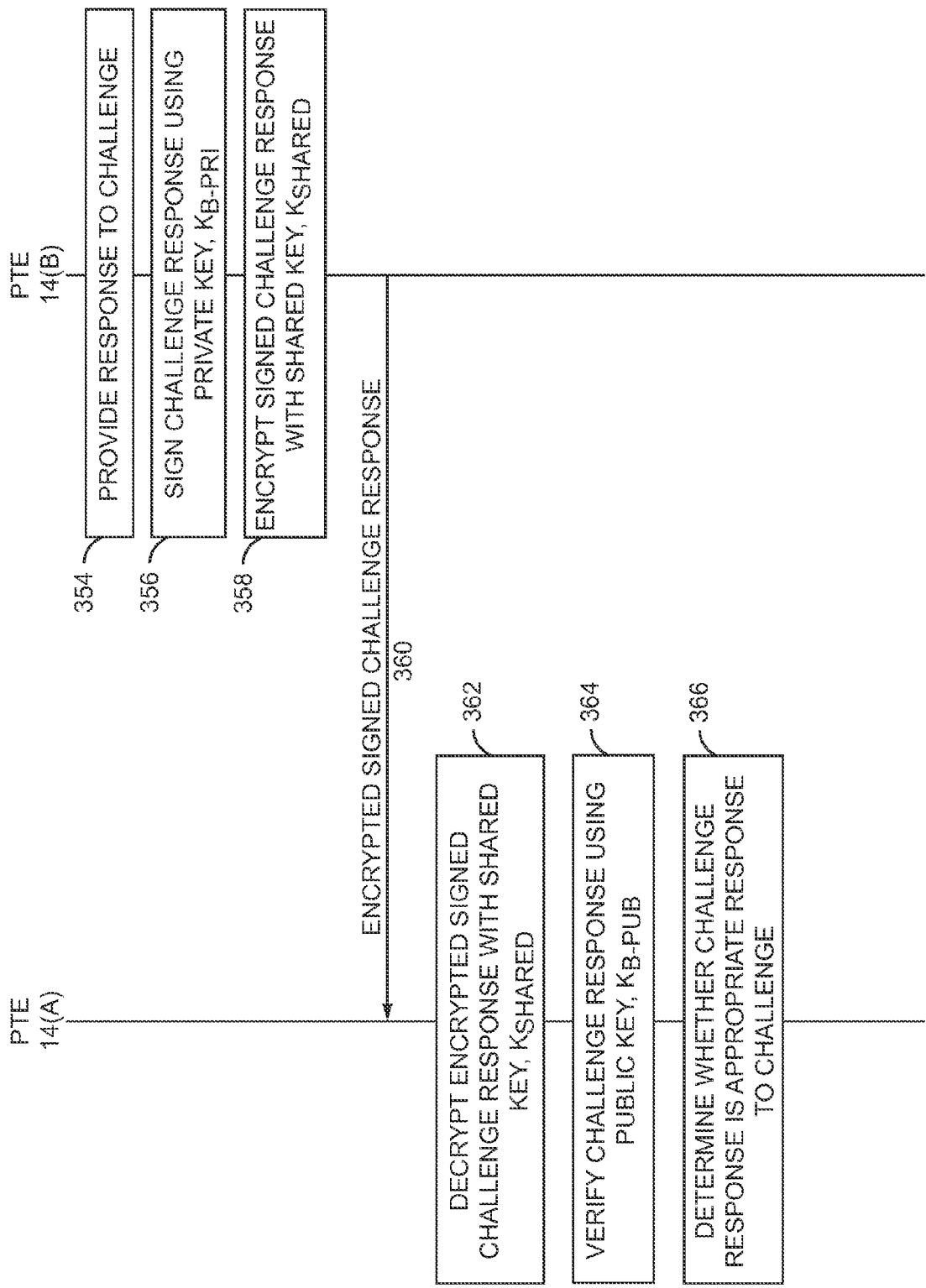

FIG. 6 is a communication flow illustrating a Diffie-Hellman key exchange process according to one embodiment of the present invention.

FIGS. 7A-7D are a communication flow illustrating an authentication process according to one embodiment of the present invention.

Figure 8A:
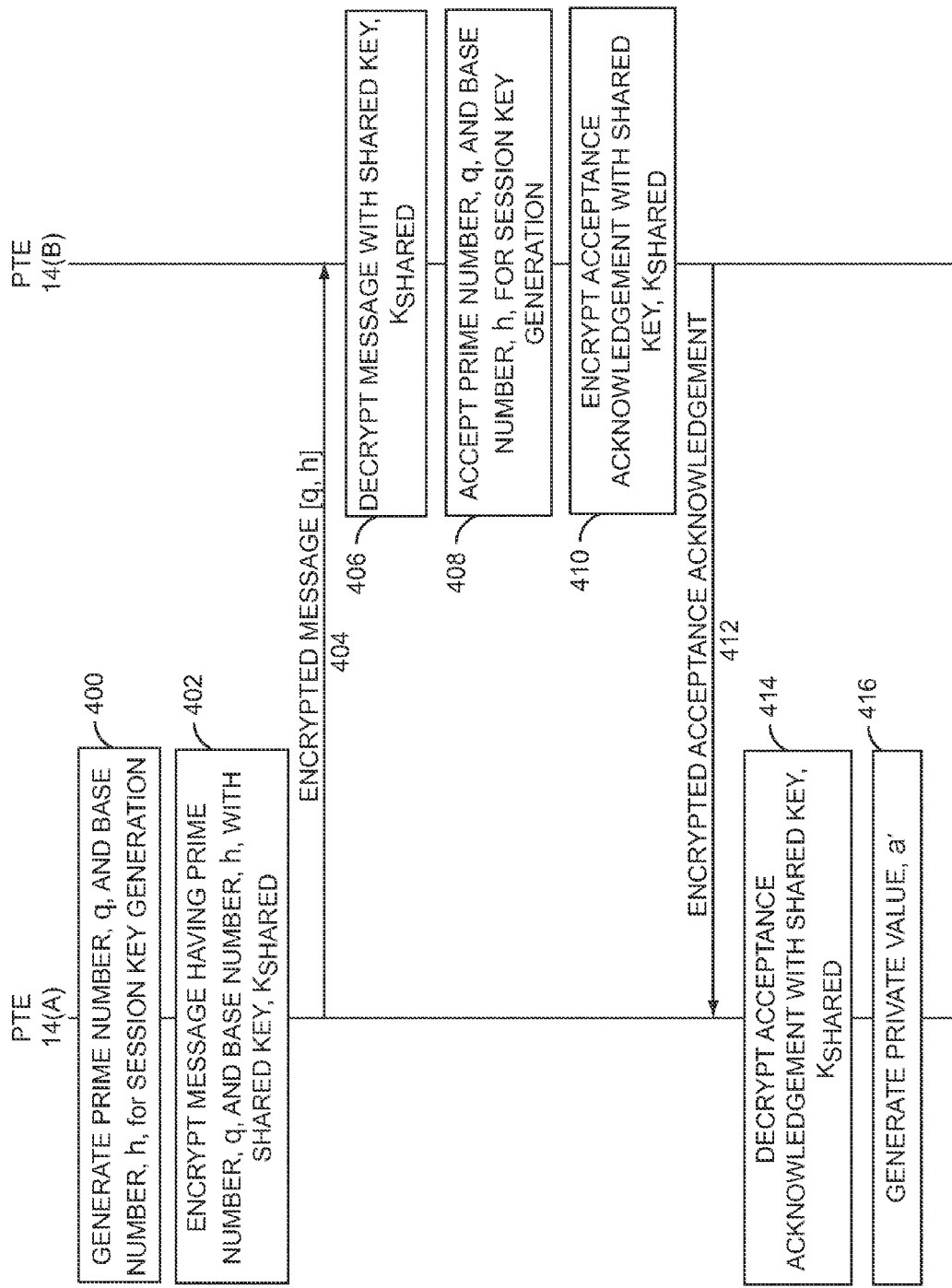
Figure 8B:
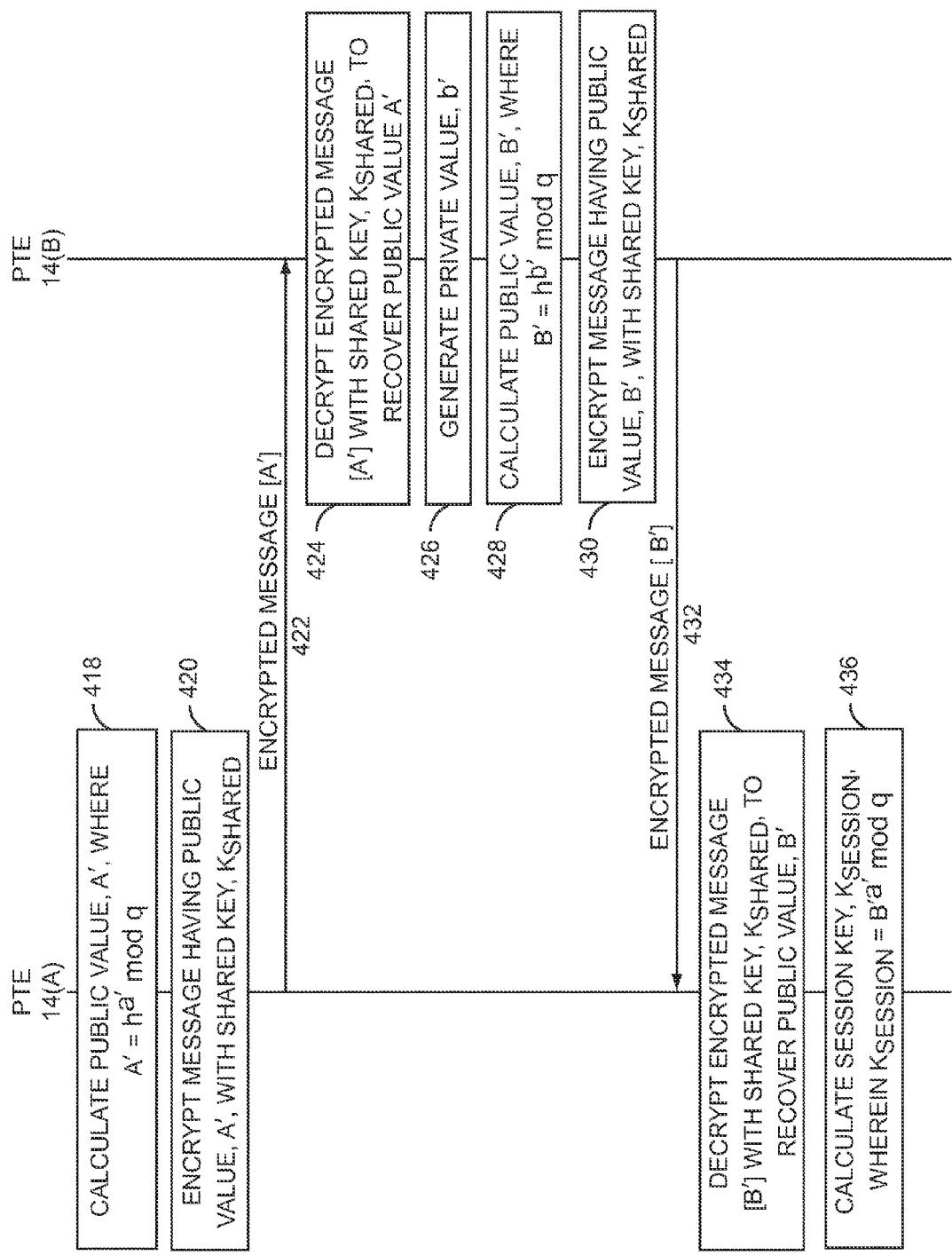
Figure 8C:
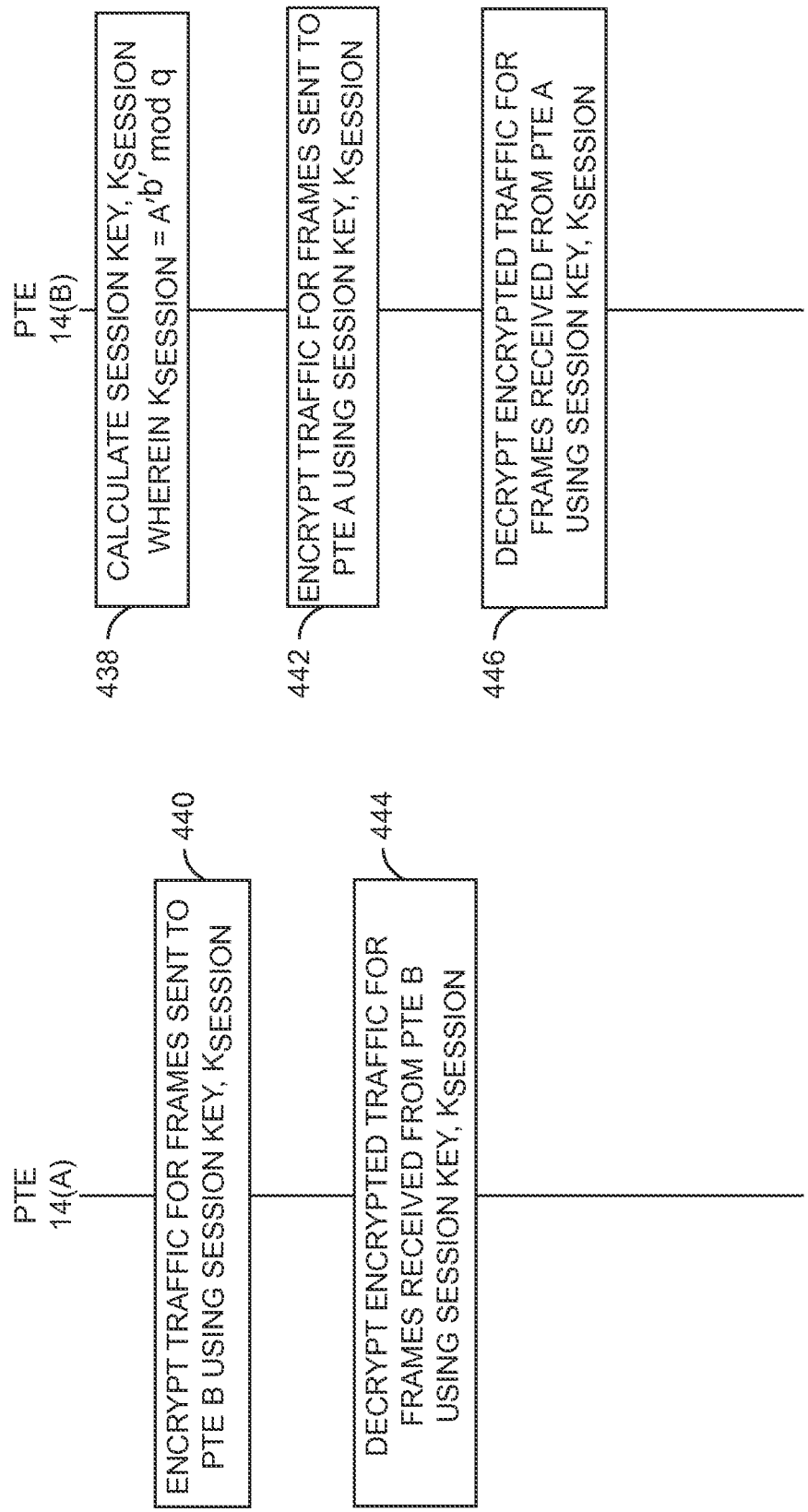

FIGS. 8A-8C are a communication flow illustrating a second Diffie-Hellman key exchange process for generating a session key according to one embodiment of the present invention.

Figure 9:
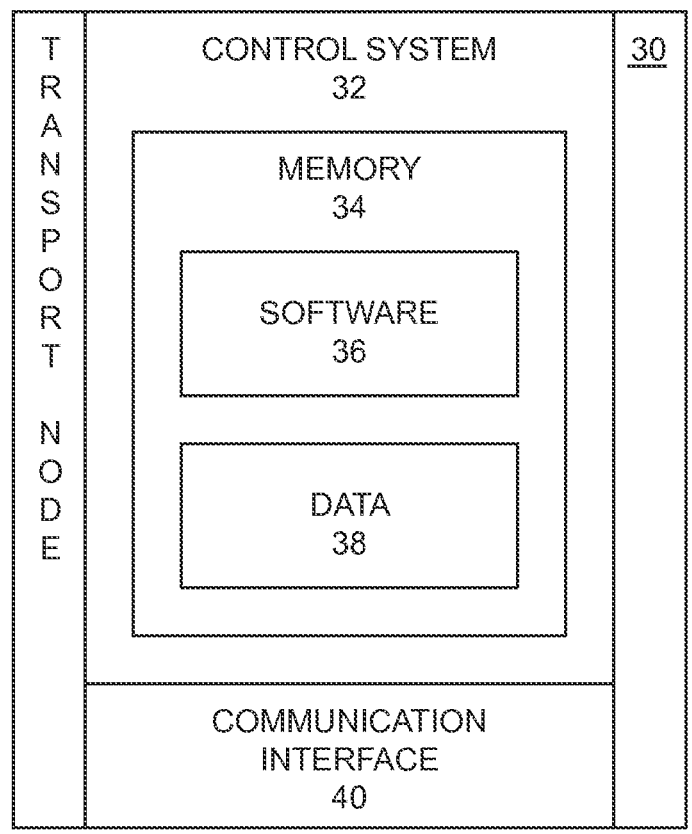

FIG. 9 is a block representation of a transport node according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention employs in-band signaling between transport nodes to provision and control session keys, which are used by the transport nodes for encrypting and decrypting traffic that is carried from one transport node to another over a transport network. Transport nodes are generally referred to as path termination equipment (PTE), and terminate paths that extend across all or a portion of a transport network. Encrypted traffic is transported between PTEs in frames. The frames include a payload for carrying the encrypted traffic and associated overhead, which is used to carry control information for managing the delivery or processing of the frames. For a given frame, encrypted traffic is mapped to the payload and any control information is mapped to the overhead for the frame. The in-band signaling for the provision and control of the session keys is provided in the overhead of the associated frames.

Prior to delving into the details of the present invention, an overview is provided of an exemplary transport network in which one embodiment of the present invention may be employed. The exemplary transport network is an optical transport network, and in particular an optical network employing Synchronous Optical Network (SONET) or Synchronous Digital Hierarchy (SDH) standards. Although SONET and SDH are described in detail, those skilled in the art will recognize the applicability of the invention concepts that are described herein to other types of optical transport networks, such as Optical Transport Network (OTN), which is defined by the International Telecommunications Union Telecommunications Standardization Sector (ITU-T).

In an effort to standardize disparate optical networks and allow them to readily work with one another, SONET and SDH standards have been promulgated and implemented in many of today's optical networks. Other synchronous and asynchronous network standards, such as those set forth for Optical Transport Networks standards, are also available; however, these networks share similar concepts with SONET and SDH. SONET and SDH are generally compatible standards and are employed in different parts of the world. SONET standards are specified in the ANSI T1.105, ANSI T1.106, and ANSI T1.1017 specification and are employed primarily in North America. SDH standards are specified by the ITU-T and are employed in Europe and most other parts of the world. All these standards and related specifications are incorporated herein by reference in their entireties.

SONET signals are referred to as a Synchronous Transport Signal (STS), and SDH signals are referred to as a Synchronous Transport Module (STM). The signals for SONET and SDH are associated with hierarchical data rates. The data rates associated with the defined signal levels are provided in the following table.

| SONET LEVEL | SDH LEVEL | DATA RATE |
|---|---|---|
| STS-1 | NOT APPLICABLE | 51.84 Mbps |
| STS-3 | STM-1 | 155.52 Mbps |
| STS-12 | STM-4 | 622.08 Mbps |
| STS-48 | STM-16 | 2.48832 Gbps |
| STS-192 | STM-64 | 9.95328 Gbps |
| STS-768 | STM-256 | 39.81312 Gbps |

As shown, the base rate in the SONET hierarchy of signals is STS-1, which corresponds to 51.84 Mbps. There is no equivalent for SDH at this hierarchical level. The next level up in the SONET hierarchy is STS-3, which corresponds to 155.52 Mbps and is exactly three times that of STS-1. A SONET STS-3 is equivalent to the lowest level of SDH signals, which are referred to as STM-1. Above STS-3 and STM-1, the data rates for the respective SONET and SDH signals are equivalent and are generally multiples of the lower level data rates. For example, the data rates for SONET STS-12 and an SDH STM-4 are equivalent and four times the data rates for STS-3 and STM-1. The hierarchical nature of the SONET and the SDH signals readily allows lower level signals to be multiplexed into higher level signals. For example, three STS-1 signals can be multiplexed into to one STS-3 signal, and so on and so forth, to facilitate aggregation and efficient transport over an optical transport network.

Figure 1:
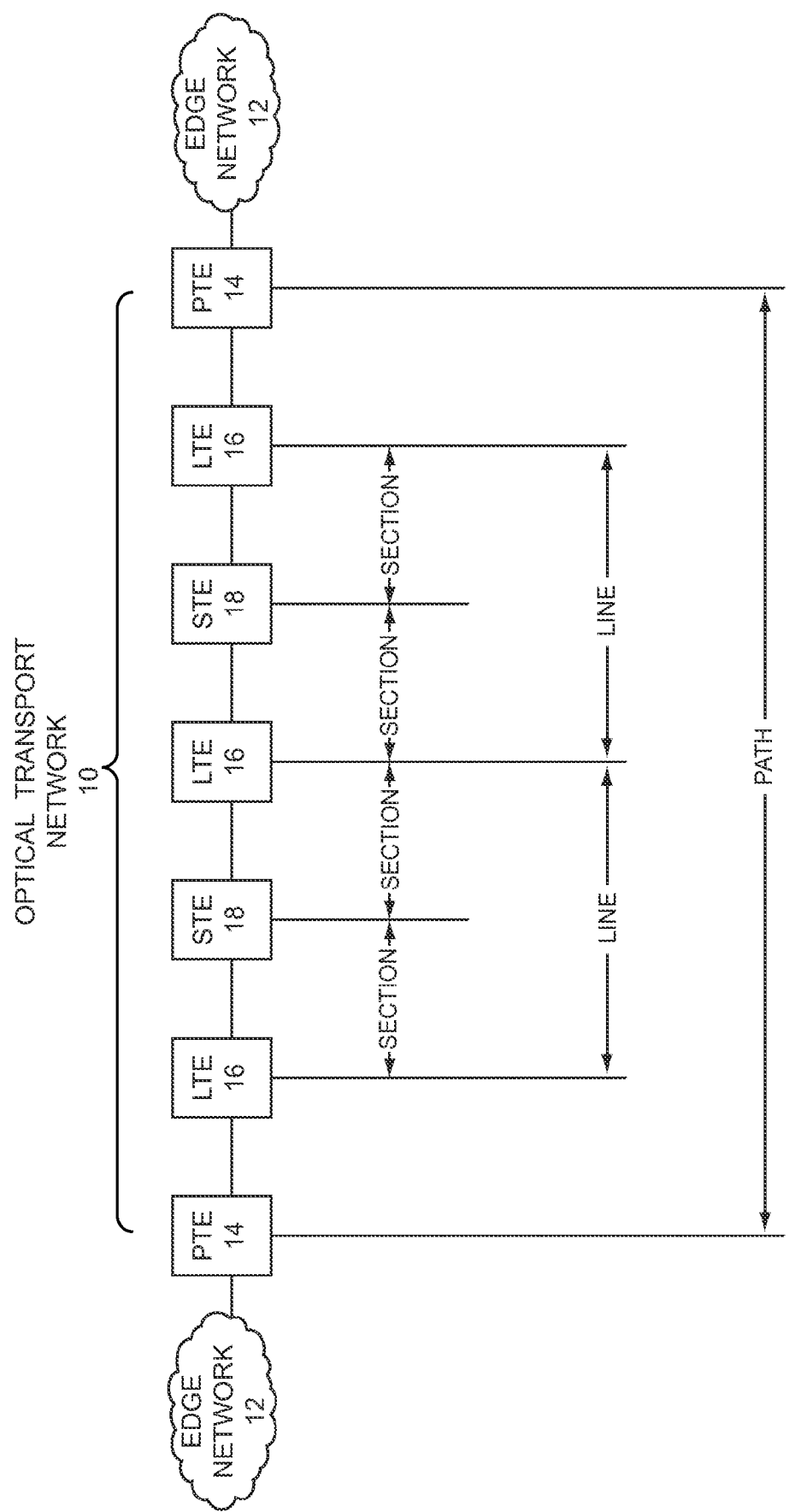
FIG. 1 is an exemplary optical transport network according to one embodiment of the present invention.

An exemplary SONET-based transport network 10 is illustrated in FIG. 1. As illustrated, the optical transport network 10 effectively couples edge networks 12, which may represent any type of electrical- or optical-based wired or wireless communication network. The edge networks 12 may connect to the optical transport network 10 using electrical or optical connections, such as those provided by T1, T3, and E1-E5 circuits as well as Gigabit Ethernet, 10 Gigabit Ethernet, an optical fiber channel, and the like. The edge networks 12 are referred to as 'edge' networks merely to describe a relationship to the optical transport network 10 and may represent access or core networks.

In a SONET environment, a path is generally the span between two transport nodes, such as the PTEs 14 that are illustrated in FIG. 1. For the purposes of this disclosure, the term 'PTE' is not specific to only SONET architectures and may apply to any type of transport node in any type of transport network where frames are used to transport traffic over a path. The PTEs 14 may represent the interface between the edge network 12 and the optical transport network 10, and provide the origination and terminating points for the span that extends through the optical transport network 10. A line is generally the span between two multiplexing entities, which may represent regular or add/drop multiplexers and are referred to as line termination equipment (LTE) 16. A section refers to the point-to-point connection between any two devices, such as repeaters, regenerators, LTEs 16, and the like. Basic repeaters and regenerators are referred to as section termination equipment (STE) 18. As such, both paths and lines may extend over multiple sections, and a path may extend over multiple lines.

Figure 2:
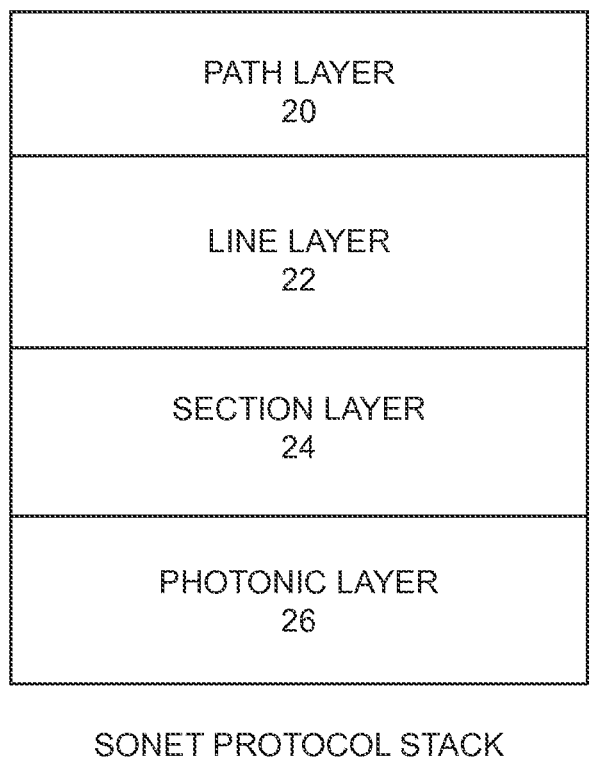
FIG. 2 illustrates a SONET protocol stack.

The path, lines, and sections correspond to three of the four protocol layers of the SONET architecture: a path layer 20, a line layer 22, and a section layer 24, which are illustrated in FIG. 2. The fourth layer is referred to as the photonic layer 26. All four layers correspond to the physical layer of the OSI protocol reference model. The path layer 20 is used by the PTE 14 to map incoming data, whether streamed or packetized, from the edge network to the payload area for a frame or frames to be transported over the optical network 10. In SONET, the payload area is provided in a region referred to as a synchronized payload envelope (SPE). The line layer 22 is used by the LTEs 16 and provides a control layer that aids in synchronization and multiplexing of information among frames. At the line layer 22, an LTE 16 can multiplex multiple lower rate STSs into a single higher rate STS. For example, three STS-1 s can by multiplexed into a single STS-3 by an LTE 16. The section layer 24 is used by the STEs 18 and other devices for managing the transmission of frames over associated sections, and in particular maintaining synchronization. The photonic layer 26 controls the conversion of signals between electrical and optical domains.

As indicated above, traffic is carried across the optical transport network 10 in frames. For SONET, a frame is broken into three primary areas: a section overhead area, a line overhead area, and the SPE. The term overhead is used to describe control information that is used to facilitate the delivery and processing of frames throughout the optical transport network 10. The control information associated with the section layer is mapped to the section overhead area, the control information associated with the line layer is mapped to the line overhead area, and the traffic being transported across the optical transport network 10 is mapped to the SPE.

Figure 3:
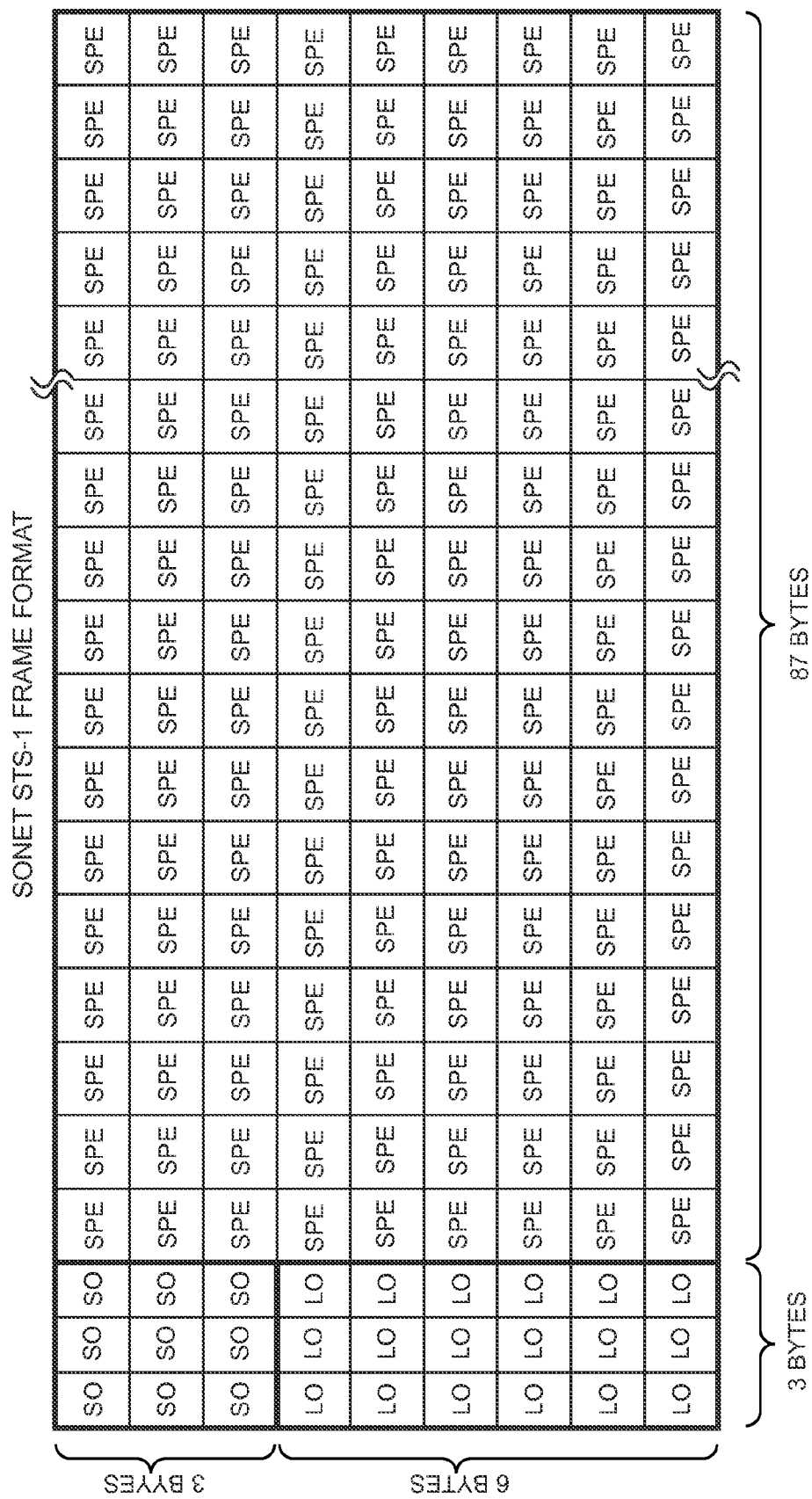
FIG. 3 illustrates a SONET STS-1 frame format.

An exemplary frame structure for an STS-1 frame is provided in FIG. 3. The basic frame format is 810 bytes and can be logically represented as being 90 bytes wide and nine (9) bytes high. The section overhead area (SO) is allocated 9 bytes, the line overhead area (LO) is allocated 18 bytes, and the SPE is allocated 87 bytes. As such, the overall frame includes 6480 bits (8 bits×810 bytes). Each STS-1 frame is transmitted every 125 microseconds to provide the defined bit rate of 51.84 Mbps. During transmission, the bytes in the section overhead area, line section overhead area, and the SPE are generally interleaved with one another, and as such, are not transmitted in the succession illustrated in the logical representation. As such, section and line overhead bytes are mixed with the SPE bytes, which include the traffic, as a frame is transmitted.

Figure 4:
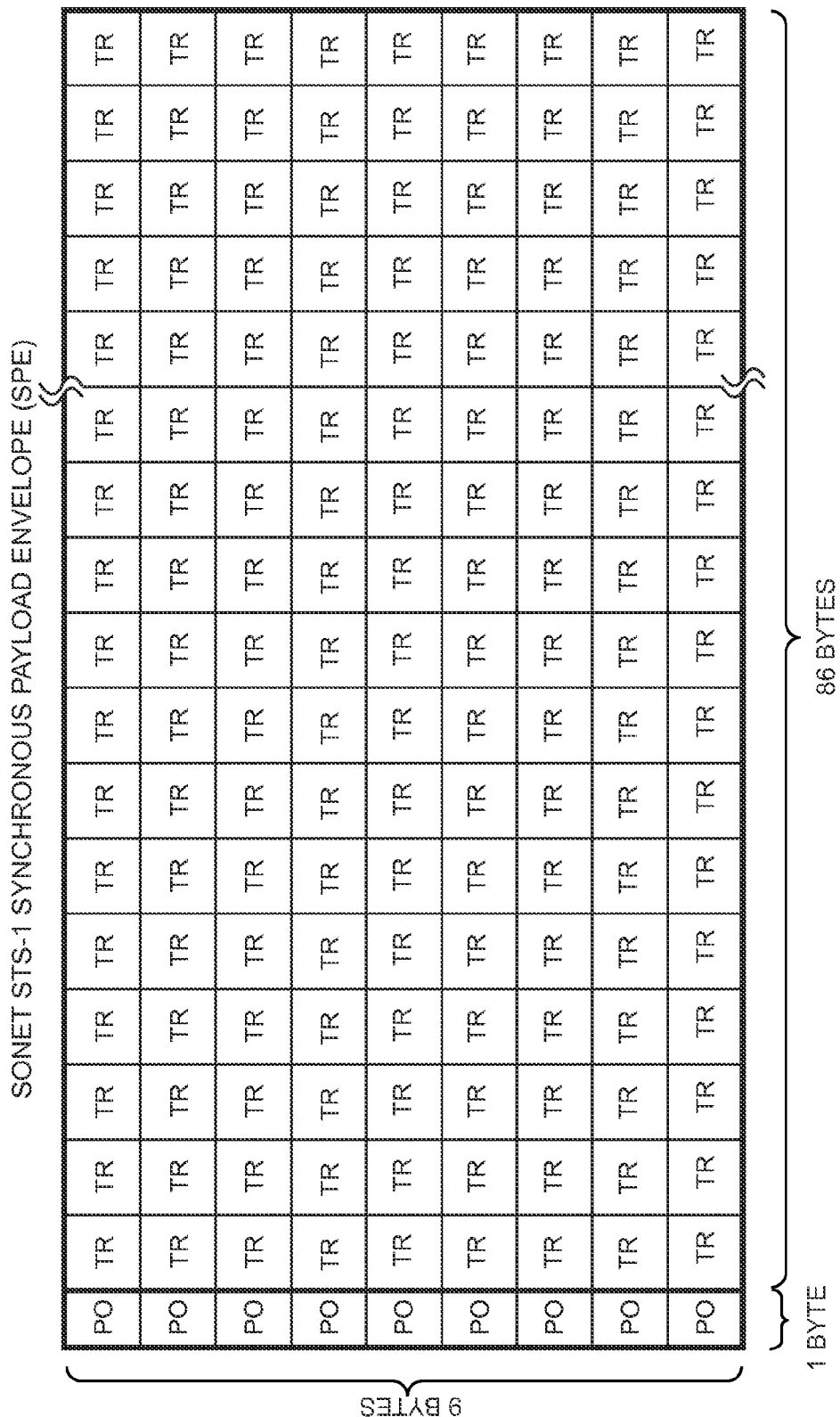
FIG. 4 illustrates a SONET STS-1 synchronous payload envelope.

An SPE format for an STS-1 frame is illustrated in FIG. 4. The control information associated with the path layer 20, or path overhead, is mapped to a path overhead area (PO) in the SPE. The traffic to be transported across the optical transport network 10 is mapped to a traffic area (TR) in the SPE. As depicted, the SPE format for an STS-1 frame is 783 bytes and can be logically represented as being 87 bytes wide and 9 bytes high. The path overhead area (PO) is one (1) byte wide and nine (9) bytes high, and the traffic overhead area (TR) is 86 bytes wide and nine (9) bytes high. Notably, the traffic will generally include actual data as well as any header information that was provided by or associated with the edge network 12. For example, the traffic may represent IP packets being received from an associated edge network 12, and each incoming IP packet will include a header and a packet payload. The packet payload includes the actual data, while the header includes routing and like information, as is well known in the art. The entire IP packet, including the header and packet payload, is considered traffic and is preferably encapsulated, but not modified, during transport over the optical transport network 10. Accordingly, the path overhead provided by the PTEs 14 is control information associated with the traffic being transported between PTEs 14 and is different from the packet payload of the IP packets.

The present invention employs in-band signaling between PTEs 14 to provision and control session keys, which are used by the PTEs 14 for encrypting and decrypting traffic that is carried from one PTE 14 to another over a path through the optical transport network 10. In operation, a first PTE 14 will receive incoming traffic from a first edge network 12, map the traffic to frames, encrypt the traffic with a session key, and send the frames with the encrypted traffic over the transport network to a second PTE 14. The second PTE 14 will extract the encrypted traffic from the frames, decrypt the encrypted traffic with a session key, and send the recovered traffic over a second edge network 12 toward an intended destination. If symmetric encryption is employed, the session key used by the first PTE 14 to encrypt the traffic will be identical to the session key used by the second PTE 14 to decrypt the traffic.

The session keys used by the PTEs 14 to encrypt and decrypt the traffic are provisioned and controlled through key messaging that is exchanged between the PTEs 14. The key messaging is exchanged between the PTEs 14 in the overhead of the frames. In order for the key messaging to readily go through the intermediate nodes (LTEs 16 and STEs 18) that terminate and re-initiate the section or line overhead, the path overhead area is used to carry the key messages that are exchanged between the PTEs 14. However, the key messaging may be provided in any designated overhead area, such as the line overhead area, section overhead area, or the like. As such, the key messaging may be provided in the overhead of the frames along with other control information that is normally provided in the overhead. Preferably, the key messaging is provided in currently reserved or otherwise unused portions of the overhead. In the future, portions of the overhead may be specially designated for such use. A single message may be broken into numerous message portions and transported from one PTE 14 to another over numerous frames to reduce the impact of the key messaging on the available overhead. Exchanging key messaging between PTEs 14 in the overhead of frames is defined as in-band key messaging. Key messaging includes messaging provided between PTEs 14 and related to any one or more of generating, selecting, changing, or otherwise controlling the session keys that are used by the PTEs 14 to encrypt and decrypt traffic.

As indicated, the session keys are used for encrypting and decrypting traffic, which is carried in the frames, and key messages are used to control the session keys. To enhance security, key messages may be encrypted using master keys, which may be symmetric or asymmetric keys and are preferably different from the session keys. As such, a first PTE 14 may generate a key message, encrypt the key message or portions of the key message, and map the key message or portions thereof to the overhead of a frame or a series of frames for delivery to a second PTE 14. The second PTE 14 will receive the frame or frames, extract the encrypted key message or portions thereof, and decrypt the key message or portions thereof. If the key message is sent in portions, the second PTE 14 will assemble the portions of the key message. Once the key message is recovered, the second PTE 14 will process the key message accordingly.

In one embodiment of the present invention, a Diffie-Hellman key exchange or like process is used to allow the first and second PTEs 14 to each derive the same secret key, without having to pass the secret key between the PTEs 14. The master key for encrypting session messages may be the secret key or be a function of the secret key. The PTEs 14 may authenticate each other to prevent man-in-the-middle attacks by unauthorized parties and then initiate session key messaging to allow the PTEs 14 to generate, select, change, or otherwise control the session keys that are used by the PTEs 14 to encrypt and decrypt the traffic carried in the frames. The session keys may be based on the secret key, master key, or a pre-provisioned value as well as be generated in a random or pseudo fashion. For example, a symmetric session key may be or be derived from a second secret key that is created from a second Diffie-Hellman or like key exchange process. Other key sharing or exchange processes may be provided through proprietary or standards based techniques such as Internet Key Exchange (IKE). Notably, the in-band messaging associated with controlling the session keys, and perhaps the messaging associated with authentication, is preferably encrypted and decrypted using the master key.

The following description provides four exemplary communication flows to illustrate operation of one embodiment of the present invention. These communication flows are exemplary of various detailed processes that may, but need not be, employed when practicing the concepts of the present invention. The communication flows are provided merely to provide an example of how the present invention can be practiced as well as provide context for the example. The first communication flow of FIGS. 5A through 5C illustrates how a pair of PTEs 14 can each generate a public and private key pair and obtain from a certificate authority a digital certificate that is useful to certify the authenticity of the public key associated with the public and private key pair, as well as other information associated with the respective PTEs 14. The second communication flow of FIG. 6 illustrates a Diffie-Hellman key exchange process wherein each of the PTEs 14 derive the same secret key, without having to pass the secret key between the PTEs 14. The secret key may be used as the master key or may be used to derive the master key. The third communication flow of FIGS. 7A through 7D illustrates an authentication process where the PTEs 14 authenticate one another. The fourth communication flow of FIGS. 8A through 8C illustrates the key messaging used for creation and use of session keys, wherein the key messaging is encrypted using a master key. Prior to describing the communication flow of FIGS. 5A through 5C, an overview of symmetric and public key cryptography as well as the use of digital certificates is provided to give context for all of the communication flows.

Certain embodiments of the present invention may employ different types of cryptography as well as employ the use of digital certificates when sharing certain types of keys used for cryptography. In general, cryptography enables users of unsecured networks to exchange information in a secure manner. Most modern cryptography techniques employ algorithms that are based on one or more keys to allow a sender to encrypt information to be transmitted over a network and a receiver to decrypt the encrypted information that was received over the network. Cryptography techniques generally fall into either a secret key cryptography or public key cryptography category. In secret key cryptography, the same secret key that is used by the sender to encrypt information is used by the receiver to decrypt the encrypted information provided by the sender. As such, the secret key for private cryptography must be shared and used by both the sender and receiver. In the illustrated embodiments of the present invention, the session and master keys that are used at any given time are secret, or symmetric, keys. However, these keys may also be part of a public and private key pair.

Public key cryptography allows users to exchange information over an unsecure network through the use of a public and private key pair, which includes a public key and a private key. Generally, the public and private keys are created simultaneously with a key generation algorithm, such as the well known Rivest, Shamir, Adleman (RSA) algorithm. Information encrypted using the private key must be decrypted using the corresponding public key, and information encrypted using the public key must be decrypted using the private key. Assume the public and private key pair is allocated to a first party. The private key is not shared and is maintained in confidence by the first party. The public key may be shared with a second party or made publicly available, if so desired. There is a need for the first party to keep the private key confidential, but there is no need for the second party or anyone else to keep the public key confidential.

In operation, the first party will use the private key to encrypt information to send to the second party. Upon receipt of the encrypted information from the first party, the second party will use the public key to decrypt the encrypted information. Further, the second party may use the public key of the first party to encrypt information to send to the first party. Upon receipt of the encrypted information from the second party, the first party will use their private key to decrypt the encrypted information provided by the second user.

The security of public key cryptography often depends on ensuring that a first party's public key is authentic and that the first party is who they say they are. A digital certificate may include the public key of the first party and information about the first party. When included in a message from the first party, a second party may use the digital certificate to obtain the first party's public key, verify that the public key belongs to the first party, and verify that the first party is who they say they are. Digital certificates are generally created by a trusted certificate authority and are provided to the first party by the certificate authority, such that the first party may include the digital certificate with certain messages to other parties. In addition to identity-related information of the first party and the first party's public key, the digital certificate information may also include information about the certificate authority, encryption algorithms, or the digital certificate itself, such as a validity period, expiration date, serial number, and the like. A common digital certificate format is provided in the International Telecommunication Union (ITU) recommendation ITU-T X.509, which is incorporated herein by reference.

The integrity of the digital certificate is maintained in part by incorporating a digital signature of the certificate authority. Notably, the certificate authority will have its own public and private key pair, which is different from any public and private key pair of any parties being served by the certificate authority. Typically, the certificate authority's digital signature is created by hashing all or a portion of the digital certificate information to provide a hash result and then encrypting the hash result with the private key of the certificate authority. The hashing process includes processing the digital certificate information by a mathematical function to create a relatively small value, or hash result, that is representative of the digital certificate information. The digital signature is associated with the digital certificate information to provide the digital certificate, which is passed to the first party. The first party may pass the digital certificate to other parties to share their public key and verify who they are.

A second party receiving the first party's digital certificate can use the certificate authority's public key, which is publicly available to the second party, to verify the authenticity of the digital certificate information provided with the digital certificate. The verification process generally includes three main steps. First, all or a portion of the digital certificate information is hashed to create a hash result. Notably, the same hashing process that was used in generating the digital signature is used during the verification process. Second, the digital signature is decrypted with the certificate authority's public key to obtain a decryption result, and finally, the hash result and the decryption result are compared. The hash result and the decryption result will correspond to each other when the digital certificate information is authentic. The second party may take further steps to ensure the digital certificate was issued from the certificate authority.

With particular reference to FIGS. 5A-5C, assume two PTEs 14(A) and 14(B) reside on either side of the optical transport network 10, wherein a path is formed therebetween. Further assume that the PTEs 14(A) and 14(B) have access to at least one certificate authority 28. In the following embodiment, the same certificate authority 28 serves both PTEs 14(A) and 14(B); however, different certificate authorities 28 could support the different PTEs 14(A) and 14(B). Initially, PTE 14(A) will generate a private key, $K_{A-PRI}$, and a public key, $K_{A-PUB}$, of a public and private key pair for the PTE 14(A) (step 100). In similar fashion, PTE 14(B) will generate a private key, $K_{B-PRI}$, and a public key $K_{B-PUB}$, of a public and private key pair for the PTE 14(B) (step 102). Assume that both the PTEs 14(A) and 14(B) will enlist the certificate authority 28 to provide digital certificates, which include the public keys, $K_{A-PUB}$ and $K_{B-PUB}$, respectively, among other information. As such, assume that PTE 14(A) will send a digital certificate request, including the public key $K_{A-PUB}$ of the PTE 14(A), to the certificate authority 28 (step 104). The digital certificate request may also include other information relating to the PTE 14(A), such as identification information of the PTE 14(A), addressing information, and the like. This information along with other information that may be provided by the certificate authority 28 is used to generate certificate information to be provided in a digital certificate for the PTE 14(A) (step 106). Notably, the certificate information will preferably include the public key $K_{A-PUB}$ for the PTE 14(A).

The certificate authority 28 will then use a hashing process to create a hash result of the certificate information for the PTE 14(A) (step 108). The hash result is encrypted with a private key $K_{CA-PRI}$ of the certificate authority 28 to provide a digital signature, which is referred to as the certificate authority's signature (step 110). Notably, the certificate authority 28 may also be associated with a public and private key pair, wherein the certificate authority 28 has a private key $K_{CA-PRI}$, which is maintained in confidence at the certificate authority 28, and a public key $K_{CA-PUB}$, which is made available to the public or at least to those entities that need access to the certificate authority's public key $K_{CA-PUB}$. The certificate authority's signature is attached to the certificate information for PTE 14(A) to provide the digital certificate $DC_A$ for PTE 14(A) (step 112). Once the digital certificate $DC_A$ for the PTE 14(A) is created, the certificate authority 28 may send the PTE's digital certificate $DC_A$ to the PTE 14(A) (step 114). The digital certificate $DC_A$ will include in the certificate information the public key $K_{A-PUB}$ for PTE 14(A). At this time or at some other point in time prior to or after the delivery of the digital certificate $DC_A$ to PTE 14(A), the certificate authority 28 may also provide its public key $K_{CA-PUB}$, to the PTE 14(A) (step 116). As illustrated, the public key $K_{CA-PUB}$ for the certificate authority 28 is provided in a digital certificate of the certificate authority 28. The digital certificate $DC_{CA}$ for the certificate authority 28 may include various certificate information related to the certificate authority 28.

Next, PTE 14(B) will send a digital certificate request, including the public key $K_{B-PUB}$ of PTE 14(B), to the certificate authority 28 (step 118). The digital certificate request may also include other information relating to the PTE 14(B), such as identification information of the PTE 14(B), addressing information, and the like. This information along with other information that may be provided by the certificate authority 28 is used to generate certificate information to be provided in a digital certificate for the PTE 14(B) (step 120). Notably, the certificate information will preferably include the public key $K_{B-PUB}$ for the PTE 14(B).

The certificate authority 28 will then use a hashing process to create a hash result of the certificate information for the PTE 14(B) (step 122). The hash result is encrypted with a private key $K_{CA-PRI}$ of the certificate authority 28 to provide a digital signature, which is referred to as the certificate authority's signature (step 124). The certificate authority's signature is attached to the certificate information for PTE 14(B) to provide the digital certificate $DC_B$ for PTE 14(B) (step 126). Once the digital certificate $DC_B$ for the PTE 14(B) is created, the certificate authority 28 may send the PTE's digital certificate $DC_B$ to the PTE 14(B) (step 128). The digital certificate $DC_B$ will include in the certificate information the public key $K_{B-PUB}$ for PTE 14(B). At this time or at some other point in time prior to or after the delivery of the digital certificate $DC_B$ to PTE 14(B), the certificate authority 28 may also provide its public key $K_{CA-PUB}$ to the PTE 14(B) (step 130). As illustrated, the public key $K_{CA-PUB}$ for the certificate authority 28 is provided in a digital certificate of the certificate authority 28. The digital certificate $DC_{CA}$ for the certificate authority 28 may include various certificate information related to the certificate authority 28.

At this point, each of the PTEs 14(A) and 14(B) have created their public and private key pairs and have obtained respective digital certificates $DC_A$ and $DC_B$, which effectively certify that the public keys $K_{A-PUB}$ and $K_{B-PUB}$ are authentic. Armed with the digital certificates $DC_A$ and $DC_B$, the PTEs 14(A) and 14(B), respectively, will be able to share the respective digital certificates $DC_A$ and $DC_B$ for authentication purposes, some of which will be described further below. The PTEs 14(A) and 14(B) have access to the public key $K_{CA-PUB}$ of the certificate authority 28, which is necessary to verify the authenticity of the digital certificates $DC_A$ and $DC_B$ of the PTEs 14(A) and 14(B), respectively. As will be described further below, the public key $K_{CA-PUB}$ of the certificate authority 28 is necessary to decrypt the certificate authority's digital signature and check the authenticity of the certificate information, including the public key $K_{CA-PUB}$ of the certificate authority 28.

Continuing with the preferred embodiment, PTEs 14(A) and 14(B) will employ a key exchange process to enable each of the PTEs 14(A) and 14(B) to derive a secret key, which will act as a master key or from which a master key will be derived. Again, the master key will ultimately be used for encrypting key messages, which are part of the key messaging used by the PTEs 14(A) and 14(B) to generate and control the session keys. The session keys are used to encrypt the traffic that is carried between the PTEs 14(A) and 14(B). In this embodiment, a Diffie-Hellman key exchange process is employed to allow the PTEs 14(A) and 14(B) to generate a shared key, $K_{SHARED}$. With particular reference to the communication flow of FIG. 6, the Diffie-Hellman key exchange process is illustrated. Notably, the messaging for the Diffie-Hellman key exchange process may be provided through in-band signaling and need not be encrypted or otherwise protected, assuming a subsequent authentication process is employed. However, other embodiments may employ encryption techniques for encrypting the messaging associated with the process of generating the shared key $K_{SHARED}$.

Initially, PTEs 14(A) and 14(B) will communicate with each other through in-band signaling to agree on a prime number, p, and a base number, g, with the stipulation that the base number g is a generator of the prime number p (step 200). Assuming that PTE 14(A) is leading the process, PTE 14(A) will generate a private value a (step 202) and then calculate a public value A, where $A=g^a \mod p$ (step 204). Notably, the term "mod" refers to modulus. Through in-band signaling, PTE 14(A) will send its public value A to PTE 14(B) (step 206). Similarly, PTE 14(B) will generate a private value b (step 208), and then calculate a public value B, where $B=g^b \mod p$ (step 210). PTE 14(B) will then send the public value B to PTE 14(A) (step 212). After receiving the public value B of PTE 14(B), PTE 14(A) will calculate the shared key, $K_{SHARED}$, wherein $K_{SHARED}=B^a \mod p$. After receiving the public value A from PTE 14(A) and generating the private value b, the PTE 14(B) will calculate the shared key, $K_{SHARED}$, wherein $K_{SHARED}=A^b \mod p$ (step 216).

Importantly, the shared key $K_{SHARED}$, as calculated by PTE 14(A) and PTE 14(B), will be identical, even though the equations are different. Substituting $g^b$ for B and substituting $g^a$ for A, $K_{SHARED}=(g^a)^b \mod p=(g^b)^a \mod p$. With the Diffie-Hellman key exchange process, the shared key $K_{SHARED}$ may be calculated by PTEs 14(A) and 14(B) without having to actually transmit the shared key $K_{SHARED}$ to or between the PTEs 14(A) and 14(B). Again, the shared key $K_{SHARED}$ may represent the master key or may be used to derive the master key, which is used for encrypting the key messaging used for generating and controlling the session keys, which are described further below.

One of the issues with the Diffie-Hellman key exchange process is that the process is prone to man-in-the-middle attacks. In other words, another node may try to present itself as one of the PTEs 14(A) or 14(B) and run through the Diffie-Hellman process and generate the shared key $K_{SHARED}$. One embodiment of the present invention employs an authentication process wherein the PTEs 14(A) and 14(B) authenticate themselves to each other to ensure that any subsequent messaging is being exchanged between authenticated entities. Various authentication processes may be employed. For example, manually provisioned secret keys may be provided to both PTEs 14(A) and 14(B), wherein messages shared between the PTEs 14(A) and 14(B) are encrypted and decrypted with only authorized keys. Other authentication techniques will be appreciated by those skilled in the art; however, a preferred authentication technique employs the use of the digital certificates and public key cryptography. The communication flow of FIGS. 7A-7D illustrates an exemplary authentication process.

Initially, the PTEs 14(A) and 14(B) exchange their respective digital certificates $DC_A$ and $DC_B$, such that PTE 14(A) will have access to the public key $K_{B-PUB}$ of PTE 14(B), and PTE 14(B) will have access to the public key $K_{A-PUB}$ of PTE 14(A) (steps 300 and 302). Since these keys are exchanged in authenticable digital certificates $DC_A$ and $DC_B$, respectively, PTEs 14(A) and 14(B) will know that they have the proper public keys $K_{A-PUB}$ and $K_{B-PUB}$, respectively. Upon receipt of the digital certificate $DC_B$ for the PTE 14(B), the PTE 14(A) will take the necessary steps to verify the certificate information provided in the digital certificate $DC_B$. In this example, the PTE 14(A) will employ a hashing process to create a hash result of the certificate information provided in the digital certificate $DC_B$ (step 304). The hashing process will be the same as the hashing process used by the certificate authority 28, when the digital certificate $DC_B$ was generated. The PTE 14(A) will then decrypt the certificate authority's digital signature, which was used to sign the digital certificate $DC_B$, with the certificate authority's public key $K_{CA-PUB}$ to provide a decryption result (step 306). Next, the hash result is compared with the decryption result to verify the certificate information of the digital certificate $DC_B$ of the PTE 14(B) (step 308). The certificate information is verified when the hash result equates to the decryption result. At this point, the PTE 14(A) will have access to the public key $K_{B-PUB}$ for the PTE 14(B), and will have confidence that the public key $K_{B-PUB}$ is that of the PTE 14(B).

Upon receipt of the digital certificate $DC_A$ for the PTE 14(A), the PTE 14(B) will take the necessary steps to verify the certificate information provided in the digital certificate $DC_A$. In this example, the PTE 14(B) will also employ a hashing process to create a hash result of the certificate information provided in the digital certificate $DC_A$ (step 310). The hashing process will be the same as the hashing process used by the certificate authority 28, when the digital certificate $DC_A$ was generated. The PTE 14(B) will then decrypt the certificate authority's digital signature, which was used to sign the digital certificate $DC_A$, with the certificate authority's public key $K_{CA-PUB}$, to provide a decryption result (step 312). Next, the hash result is compared with the decryption result to verify the certificate information of the digital certificate $DC_A$ of the PTE 14(A) (step 314). The certificate information is verified when the hash result equates to the decryption result. At this point, the PTE 14(B) will have access to the public key $K_{A-PUB}$ for the PTE 14(A), and will have confidence that the public key $K_{A-PUB}$ is that of PTE 14(A).

Continuing the authentication process, assume that PTEs 14(A) and 14(B) must generate and respond to respective challenges, wherein if the challenges are responded to affirmatively the PTEs 14(A) and 14(B) can be assured that each PTE 14(A) and 14(B) is the device it represents itself to be. Accordingly, PTE 14(B) may generate a challenge, which may be a query for information assumed to be known only by authorized devices, or by the PTE 14(A) in particular (step 316). Using its private key $K_{B-PRI}$, PTE 14(B) may sign the challenge to create a signed challenge (step 318). Signing the challenge may include using a hashing process to create a hash result of the challenge, encrypting the challenge with the private key $K_{B-PRI}$ to create a digital signature, and attaching the digital signature to the challenge. At this point, messages exchanged between the PTEs 14(A) and 14(B) may be provided in-band and are preferably encrypted using the master key. In this example, assume the master key is the shared key $K_{SHARED}$, which was derived by both the PTE 14(A) and the PTE 14(B) using the Diffie-Hellman key exchange process described above. Accordingly, the signed challenge is encrypted with the shared key $K_{SHARED}$ (step 320), and is sent to the PTE 14(A) via in-band signaling (step 322).

The PTE 14(A) will receive and decrypt the encrypted signed challenge with the shared key $K_{SHARED}$ to recover the signed challenge (step 324). The PTE 14(A) will then verify the challenge using the public key $K_{B-PUB}$ of the PTE 14(B) (step 326). Verification may include using the hashing process to create a hash result of the challenge, decrypting the digital signature that is associated with the signed challenge with the public key $K_{B-PUB}$ of the PTE 14(B) to provide a decryption result, and comparing the hash result with the decryption result. Assuming the challenge is verified, the PTE 14(A) will process the challenge and provide a response to the challenge (step 328). The PTE 14(A) may sign the challenge response using its private key $K_{A-PRI}$ (step 330). Signing of the challenge response may be provided in the same manner in which prior digital signatures were created. The signed challenge response is then encrypted with the shared key $K_{SHARED}$ (step 332) and delivered via in-band signaling to the PTE 14(B) (step 334).

The PTE 14(B) will decrypt the encrypted signed challenge response with the shared key $K_{SHARED}$ to recover the signed challenge response (step 336). The challenge response provided with the signed challenge response is verified using the public key $K_{A-PUB}$ of the PTE 14(A) (step 338). The verification process is similar to that described above. Assuming the challenge response is verified, the PTE 14(B) will then determine whether the challenge response is an appropriate response to the challenge that it issued (step 340). At this point, the PTE 14(B) has authenticated PTE 14(A). Those skilled in the art will recognize that in this communication flow and the other communication flows, the messaging and signaling exchange between the PTEs 14(A) and 14(B) are used to illustrate basic functionality, and may not represent all of the signaling required to facilitate the desired processes. The communication flows are pseudo-flows that represent the basic function and messaging associated with the given processes.

Next, PTE 14(A) may generate a challenge, which may be a query for information assumed to be known only be authorized devices, or the PTE 14(B) in particular (step 342). Using its private key $K_{A-PRI}$, PTE 14(A) may sign the challenge to create a signed challenge (step 344). Signing the challenge may include using a hashing process to create a hash result of the challenge, encrypting the challenge with the private key $K_{A-PRI}$ to create a digital signature, and attaching the digital signature to the challenge. At this point, messages exchanged between the PTEs 14(A) and 14(B) may be provided in-band and are preferably encrypted using the master key. Again, assume the master key is the shared key $K_{SHARED}$, which was derived by both the PTE 14(A) and the PTE 14(B) using the Diffie-Hellman key exchanged process described above. Accordingly, the signed challenge is encrypted with the shared key $K_{SHARED}$ (step 346), and is sent to the PTE 14(B) via in-band signaling (step 348).

The PTE 14(B) will receive and decrypt the encrypted signed challenge with the shared key $K_{SHARED}$ to recover the signed challenge (step 350). The PTE 14(B) will then verify the challenge using the public key $K_{A-PUB}$ of the PTE 14(A) (step 352). Verification may include using the hashing process to create a hash result of the challenge, decrypting the digital signature that is associated with the signed challenge with the public key $K_{A-PUB}$ of the PTE 14(A) to provide a decryption result, and compare the hash result with the decryption result. Assuming the challenge is verified, the PTE 14(B) will process the challenge and provide a response to the challenge (step 354). The PTE 14(B) may sign the challenge response using its private key $K_{B-PRI}$ (step 356). Signing of the challenge response may be provided in the same manner in which prior digital signatures were created. The signed challenge response is then encrypted with the shared key $K_{SHARED}$ (step 358) and delivered via in-band signaling to the PTE 14(A) (step 360).

The PTE 14(A) will decrypt the encrypted signed challenge response with the shared key $K_{SHARED}$ to recover the signed challenge response (step 362). The challenge response provided with the signed challenge response is verified using the public key $K_{B-PUB}$ of the PTE 14(B) (step 364). The verification process is similar to that described above. Assuming the challenge response is verified, the PTE 14(A) will then determine whether the challenge response is an appropriate response to the challenge that it issued (step 366). At this point, the PTE 14(A) has authenticated PTE 14(B).

At this point, the PTEs 14(A) and 14(B) have authenticated one another, as well as generated a shared key $K_{SHARED}$ that acts as a master key for encrypting at least certain messages that are exchanged between the PTEs 14(A) and 14(B) through in-band signaling. Continuing with the example, the communication flows of FIGS. 8A-8C illustrate a process of generating a session key that will be used by both the PTE 14(A) and the PTE 14(B) for encrypting and decrypting traffic that is delivered between the PTEs 14(A) and 14(B) over the optical transport network 10. In this example, the messaging exchanged between the PTEs 14(A) and 14(B) to generate a session key $K_{SESSION}$ is encrypted using the shared key $K_{SHARED}$ (master key). Further, numerous techniques may be employed to generate or select the session key $K_{SESSION}$. In this embodiment, a second Diffie-Hellman key exchange process is used to generate the session key $K_{SESSION}$. Accordingly, the session key $K_{SESSION}$ is independent of the shared key $K_{SHARED}$ (master key); however, the session key $K_{SESSION}$ may be derived from the shared key $K_{SHARED}$ in select embodiments. Regardless of the way in which the session key $K_{SESSION}$ is obtained, the messaging associated with generating or selecting the session key $K_{SESSION}$ is provided through in-band signaling between the PTE 14(A) and the PTE 14(B).

In this embodiment, assume the process begins by PTE 14(A) generating a prime number q and a base number h, which will be used for generating the session key $K_{SESSION}$ (step 400). A message having the prime number q and the base number h is encrypted with the shared key $K_{SHARED}$ (master key) (step 402) and sent to the PTE 14(B) via in-band signaling (step 404). The PTE 14(B) will decrypt the message with the shared key $K_{SHARED}$ (step 406) and accept the prime number q and base number h for generating the session key $K_{SESSION}$ using a Diffie-Hellman key exchange process (step 408). The PTE 14(B) will generate an acceptance acknowledgment, encrypt the acceptance acknowledgement with the shared key $K_{SHARED}$ (step 410), and send the encrypted acceptance acknowledgement to the PTE 14(A) via in-band signaling (step 412). The PTE 14(A) will decrypt the encrypted acceptance acknowledgement message with the shared key $K_{SHARED}$ (step 414), and begin the second phase of the Diffie-Hellman key exchange process.

The PTE 14(A) will generate a private value a' (step 416) and calculate a public value A', where $A'=h^{a'}$ mod q (step 418). The PTE 14(A) will generate and encrypt a message having the public value A' with the shared key $K_{SHARED}$ (step 420). The encrypted message is delivered through in-band signaling to the PTE 14(B) (step 422), which will decrypt the encrypted message with the shared key $K_{SHARED}$ to recover the public value A' (step 424). PTE 14(B) will then generate a private value b' (step 426) and then calculate a public value B', where $B'=h^{b'}$ mod q (step 428). PTE 14(B) will generate and encrypt a message having a public value B' with the shared key $K_{SHARED}$ (step 430) and will send the encrypted message via in-band signaling to the PTE 14(A) (step 432). The PTE 14(A) will decrypt the encrypted message with the shared key $K_{SHARED}$ to recover the public value B' (step 434). Armed with the public value B' and the private value a', the PTE 14(B) will calculate the session key $K_{SESSION}$, wherein $K_{SESSION}=B'^{a'}$ mod q (step 436). Similarly, PTE 14(B) will have access to the public value A' of PTE 14(A) and the private value b', and will calculate the session key $K_{SESSION}$ wherein $K_{SESSION}=A'^{b'}$ mod q (step 438).

Given the symmetry of the Diffie-Hellman key exchange process, the session keys $K_{SESSION}$ that are calculated by the PTEs 14(A) and 14(B) will be identical. Once the session keys $K_{SESSION}$ are in place, the PTEs 14(A) and 14(B) may encrypt and decrypt traffic that is being delivered to each other over the optical network 10. In particular, incoming traffic from an associated edge network 12 may be encrypted using the session key $K_{SESSION}$, and mapped into frames being sent to the PTE 14(B) (step 440). Similarly, incoming traffic from an associated edge network 12 may be encrypted using the session key $K_{SESSION}$, and mapped into frames being sent to the PTE 14(A) (step 442). Accordingly, for frames being received from PTE 14(B), PTE 14(A) will decrypt the encrypted traffic using the session key $K_{SESSION}$, and deliver the traffic over the associated edge network 12 in an appropriate format, wherein any necessary conversions or reformatting of the traffic is provided by the PTE 14(A) (step 444). For frames being received from PTE 14(A), PTE 14(B) will decrypt the encrypted traffic using the session key $K_{SESSION}$, and deliver the traffic over the associated edge network 12 in an appropriate format, wherein any necessary conversions or reformatting of the traffic is provided by the PTE 14(B) (step 446).

Accordingly, the session key $K_{SESSION}$ is used for encrypting traffic being sent over the optical transport network 10 and decrypting encrypted traffic that is received over the optical transport network 10. The shared key $K_{SHARED}$ (master key) is used for encrypting the messaging used to generate, select, or otherwise control the session keys. All of the messaging is provided via in-band signaling, and is preferably mapped to overhead associated with the various frames. The session signaling may be used to change, update, or generate the necessary instructions for providing any of these functions, such that the session key $K_{SESSION}$ may be periodically changed or updated in a synchronized fashion. Again, the control information associated with the session key $K_{SESSION}$ will be encrypted using the master key. In a SONET or SDH environment, the in-band messaging for authentication or session key control is preferably provided in the path overhead, which is provided in the SPE along with the encrypted traffic.

Since the messages associated with authentication and session key control may be larger than the available overhead space in a particular frame, each message may be broken into multiple portions, wherein each portion is encrypted and carried in a different frame. The receiving PTE 14 will extract each portion of the message from a series of frames, decrypt each portion of the message, and assemble the portions of the message to recover the original message. Once assembled, the message may be processed in a desired fashion. Alternatively, the message may be encrypted first and then divided into portions, which are carried in different frames. The encrypted portions may be assembled and then decrypted to recover the message. When a message is partitioned as described above, a portion of the message may need to be allocated for identifying information that is part of the message, how many frames or what frames include portions of the message, and the like. In essence, the receiving PTE 14 needs to be able to determine when these messages are being delivered, how they are being delivered, and how to reassemble the messages, if necessary.

With reference to FIG. 9, a block diagram of a transport node 30 is illustrated. The transport node 30 may represent any of the devices in a transport network, such as the optical transport network 10. As such, the transport node 30 may represent a PTE 14, LTE 16, STE 18, or the like. The transport node 30 will have a control system 32 with sufficient memory 34 for the requisite software 36 and data 38 to operate as described above. The control system 32 will also be associated with a communication interface 40 to facilitate communications over a transport network, and if so configured, an associated edge network 12. Given the speed at which these devices need to operate, the control system 32 and memory 34 may be embodied in a field programmable gate array (FPGA) or the like.

Those skilled in the art will recognize improvements and modifications to the preferred embodiments of the present invention. All such improvements and modifications are considered within the scope of the concepts disclosed herein and the claims that follow.

What is claimed is:

1. A method of operating a local transport node to enable secure delivery of encrypted traffic via frames over a transport network comprising:

communicating via in-band signaling with a remote transport node over a transport network to select a session key, the in-band signaling being provided in at least one frame of a first group of frames, the in-band signaling comprising at least one session key message bearing on selection of the session key, the session key message being encrypted by a master key when being transported between the local transport node and the remote transport node over the transport network, the master key being used to additionally encrypt authentication messages sent between the local transport node and the remote transport node, the authentication messages being unrelated to selection of the session key;

receiving first traffic from a first network;

encrypting the first traffic with the session key to generate encrypted first traffic; and transmitting the encrypted first traffic toward the remote transport node over the transport network in at least one frame of a second group of frames.

2. The method of claim 1 wherein each of the frames comprises an overhead portion and a payload portion, the in-band signaling is supported via the overhead portion in the at least one frame of the first group of frames, and the encrypted first traffic is transmitted in the payload portion of the at least one frame of the second group of frames.

3. The method of claim 1, wherein the at least one frame of the first group of frames includes at least one outgoing frame being transmitted toward the remote transport node, and at least one outgoing session key message of the in-band signaling is provided in the at least one outgoing frame, the at least one outgoing session key message bearing on the selection of the session key.

4. The method of claim 1 wherein the at least one frame of the first group of frames includes at least one incoming frame received from the remote transport node, and wherein at least one incoming session key message of the in-band signaling is provided in the at least one incoming frame, the at least one incoming session key message bearing on the selection of the session key.

5. The method of claim 1, wherein:
the at least one frame of the first group of frames includes at least one outgoing frame being transmitted toward the remote transport node, and at least one outgoing session key message of the in-band signaling is provided in the at least one outgoing frame, the at least one outgoing session key message bearing on the selection of the session key; and
the at least one frame of the first group of frames further includes at least one incoming frame received from the remote transport node, and wherein the at least one incoming session key message of the in-band signaling is provided in the at least one incoming frame, incoming session key message bearing on the selection of the session key.

6. The method of claim 1 wherein other encrypted traffic is delivered toward the remote transport node in at least one outgoing frame in the at least one frame of the first group of frames.

7. The method of claim 1 wherein certain encrypted traffic is received from the remote transport node in at least one incoming frame in the at least one frame of the first group of frames.

8. The method of claim 1 wherein the session key is a symmetric cryptography key.

9. The method of claim 1 wherein the master key is a symmetric cryptography key.

10. The method of claim 1 wherein the master key is selected based on a Diffie-Hellman key exchange process facilitated via further in-band signaling.

11. The method of claim 1 wherein the at least one session key message is broken into a plurality of message portions, and each of the plurality of message portions is encrypted and transmitted toward the remote transport node in a separate frame of the first group of frames.

12. The method of claim 1 wherein communicating via in-band signaling with the remote transport node over the transport network to select the session key comprises:
generating an outgoing session key message bearing on the selection or control of the session key;
encrypting the outgoing session key message to provide an encrypted outgoing session key message; and
transmitting the encrypted outgoing session key message toward the remote transport node over the transport network in the at least one frame of the first group of frames.

13. The method of claim 1 further comprising communicating via further in-band signaling with the remote transport node over the transport network to facilitate an authentication process between a local transport node and the remote transport node, wherein the further in-band signaling is provided in at least one frame of a third group of frames.

14. The method of claim 13 wherein the authentication process comprises:
providing first authentication information of the local transport node to the remote transport node to allow the remote transport node to authenticate the local transport node;
receiving second authentication information of the remote transport node from the remote transport node; and
processing the second authentication information to authenticate the remote transport node.

15. The method of claim 14 wherein the further in-band signaling with the remote transport node to facilitate the authentication process comprises at least one authentication message, which is encrypted when being transported to or received from the remote transport node over the transport network.

16. The method of claim 1 wherein the session key is selected based on a Diffie-Hellman key exchange process.

17. The method of claim 1 further comprising:
receiving encrypted second traffic from the remote transport node over the transport network in at least one frame of a third group of frames;
decrypting the encrypted second traffic with the session key to provide second traffic; and
transmitting the second traffic over the first network.

18. A local transport node enabling secure delivery of encrypted traffic via frames over a transport network comprising:
at least one communication network;
a control system associated with the at least one communication network and adapted to:
communicate via in-band signaling with a remote transport node over a transport network to select a session key, the in-band signaling being provided in at least one frame of a first group of frames, the in-band signaling comprising at least one session key message bearing on selection of the session key, the session key message being encrypted by a master key when being transported between the local transport node and the remote transport node over the transport network, the master key being used to additionally encrypt authentication messages sent between the local transport node and the remote transport node, the authentication messages being unrelated to selection of the session key;
receive first traffic from a first network;
encrypt the first traffic with the session key to generate encrypted first traffic; and
transmit the encrypted first traffic toward the remote transport node over the transport network in at least one frame of a second group of frames.

19. The local transport node of claim 18 wherein each of the frames comprises an overhead portion and a payload portion, the in-band signaling supported via the overhead portion in the at least one frame of the first group of frames, and the encrypted first traffic is transmitted in the payload portion of the at least one frame of the second group of frames.

20. The local transport node of claim 18 wherein other encrypted traffic is delivered toward the remote transport node in at least one outgoing frame in the at least one frame of the first group of frames.

21. The local transport node of claim 18 wherein the control system is further adapted to communicate via further in-band signaling with the remote transport node over the transport network to facilitate an authentication process with the remote transport node, wherein the further in-band signaling is provided in at least one frame of a third group of frames.

22. The local transport node of claim 18 wherein the session key is selected based on a Diffie-Hellman key exchange process.

* * * * *